(12) United States Patent
Powell

(10) Patent No.: US 8,846,993 B2
(45) Date of Patent: Sep. 30, 2014

(54) BIOMASS CONVERSION SYSTEMS HAVING A FLUID CIRCULATION LOOP CONTAINING BACKFLUSHABLE FILTERS FOR CONTROL OF CELLULOSIC FINES AND METHODS FOR USE THEREOF

(75) Inventor: Joseph Broun Powell, Houston, TX (US)

(73) Assignee: Shell Oil Company, Houston, TX (US)

( * ) Notice: Subject to any disclaimer, the term of this patent is extended or adjusted under 35 U.S.C. 154(b) by 28 days.

(21) Appl. No.: 13/332,309

(22) Filed: Dec. 20, 2011

(65) Prior Publication Data

US 2013/0152456 A1  Jun. 20, 2013

Related U.S. Application Data

(60) Provisional application No. 61/576,623, filed on Dec. 16, 2011.

(51) Int. Cl.
C07C 1/00 (2006.01)

(52) U.S. Cl.
USPC .............. 585/240; 585/242; 127/37; 435/166

(58) Field of Classification Search
USPC ....... 585/240, 242; 44/605; 127/37; 530/302; 435/166
See application file for complete search history.

(56) References Cited

U.S. PATENT DOCUMENTS

| | | | |
|---|---|---|---|
| 4,461,648 A * | 7/1984 | Foody | 127/37 |
| 4,485,008 A | 11/1984 | Maa et al. | |
| 4,752,579 A * | 6/1988 | Arena et al. | 435/99 |
| 4,906,357 A | 3/1990 | Drori | |
| 6,663,777 B2 * | 12/2003 | Schimel | 210/603 |
| 7,189,306 B2 * | 3/2007 | Gervais | 162/21 |
| 7,649,086 B2 * | 1/2010 | Belanger et al. | 530/502 |
| 7,820,418 B2 * | 10/2010 | Karl et al. | 435/161 |
| 7,985,847 B2 * | 7/2011 | Belanger et al. | 530/502 |
| 8,092,680 B2 * | 1/2012 | Johnson | 210/603 |
| 8,287,651 B2 * | 10/2012 | Benson et al. | 127/37 |

(Continued)

FOREIGN PATENT DOCUMENTS

| | | |
|---|---|---|
| EP | 0204354 | 12/1986 |
| EP | 2182047 | 5/2010 |

(Continued)

OTHER PUBLICATIONS

Peineman, K. et al.; "Fundamentals of Fouling"; Membranes for Water Treatment; vol. 4. X; Aug. 31, 2007.

(Continued)

Primary Examiner — Nina Bhat

(57) ABSTRACT

Digestion of cellulosic biomass to produce a hydrolysate may be accompanied by the formation of cellulosic fines which may be damaging to system components. Biomass conversion systems that may address the issue of cellulosic fines may comprise a fluid circulation loop comprising: a hydrothermal digestion unit; a solids separation unit that is in fluid communication with an outlet of the hydrothermal digestion unit; where the solids separation unit comprises a plurality of filters and the filters are in fluid communication with the fluid circulation loop in both a forward and a reverse flow direction; and a catalytic reduction reactor unit that is in fluid communication with an outlet of the solids separation unit and an inlet of the hydrothermal digestion unit; where at least one of the plurality of filters is in fluid communication with an inlet of the catalytic reduction reactor unit.

24 Claims, 3 Drawing Sheets

(56) References Cited

U.S. PATENT DOCUMENTS

| | | | |
|---|---|---|---|
| 8,309,696 B2 * | 11/2012 | Fujii et al. | 534/566 |
| 2007/0010682 A1 | 1/2007 | Myllyoja et al. | |
| 2008/0050792 A1 | 2/2008 | Zmierczak et al. | |
| 2010/0000908 A1 | 1/2010 | Markkanen et al. | |
| 2010/0313882 A1 * | 12/2010 | Dottori et al. | 127/37 |

FOREIGN PATENT DOCUMENTS

| | | | |
|---|---|---|---|
| WO | 0011112 | | 3/2000 |
| WO | 2006029456 | | 3/2006 |
| WO | 2010071805 | * | 6/2010 |
| WO | 2010121367 | | 10/2010 |

OTHER PUBLICATIONS

Van Der Drift, A., et al.; "Entrained Flow Gasification of BioMass"—Ash Behaviour, Feeding Issues, and System Analyses; ECN-C--4-039, 64 pages; Apr. 2004.

Verte, A. et al.; "Biomass to Biofuels: Strategies for Global Industries"; XP002689545; ISBN 978-0-470-75002-5; pp. 1-7; May 12, 2010.

International Search Report for corresponding PCT/US2011/066113 dated Jan. 17, 2013; 7 pages.

* cited by examiner

BIOMASS CONVERSION SYSTEMS HAVING A FLUID CIRCULATION LOOP CONTAINING BACKFLUSHABLE FILTERS FOR CONTROL OF CELLULOSIC FINES AND METHODS FOR USE THEREOF

The present application claims the benefit of pending U.S. Provisional Patent Application Ser. No. 61/576,623 filed Dec. 16, 2011, the entire disclosure of which is hereby incorporated by reference.

FIELD OF THE INVENTION

The present disclosure generally relates to the processing of cellulosic biomass solids using digestion to produce a hydrolysate, and, more specifically, to biomass conversion systems and methods that allow cellulosic fines to be removed via filtration from a hydrolysate produced during the digestion of cellulosic biomass solids.

BACKGROUND

Significant attention has been placed on developing alternative energy sources to fossil fuels. One fossil fuel alternative having significant potential is biomass, particularly cellulosic biomass such as, for example, plant biomass. As used herein, the term "biomass" will refer to a living or recently living biological material. Complex organic molecules within biomass can be extracted and broken down into simpler organic molecules, which can subsequently be processed through known chemical transformations into industrial chemicals or fuel blends (i.e., a biofuel). In spite of biomass's potential in this regard, particularly plant biomass, an energy- and cost-efficient process that enables the conversion of biomass into such materials has yet to be realized.

Cellulosic biomass is the world's most abundant source of carbohydrates due to the lignocellulosic materials located within the cell walls of higher plants. Plant cell walls are divided into two sections: primary cell walls and secondary cell walls. The primary cell wall provides structural support for expanding cells and contains three major polysaccharides (cellulose, pectin, and hemicellulose) and one group of glycoproteins. The secondary cell wall, which is produced after the cell has finished growing, also contains polysaccharides and is strengthened through polymeric lignin covalently crosslinked to hemicellulose. Hemicellulose and pectin are typically found in abundance, but cellulose is the predominant polysaccharide and the most abundant source of carbohydrates. Collectively, these materials will be referred to herein as "cellulosic biomass."

Plants can store carbohydrates in forms such as, for example, sugars, starches, celluloses, lignocelluloses, and/or hemicelluloses. Any of these materials can represent a feedstock for conversion into industrial chemicals or fuel blends. Carbohydrates can include monosaccharides and/or polysaccharides. As used herein, the term "monosaccharide" refers to hydroxy aldehydes or hydroxy ketones that cannot be further hydrolyzed to simpler carbohydrates. Examples of monosaccharides can include, for example, dextrose, glucose, fructose, and galactose. As used herein, the term "polysaccharide" refers to saccharides comprising two or more monosaccharides linked together by a glycosidic bond. Examples of polysaccharides can include, for example, sucrose, maltose, cellobiose, and lactose. Carbohydrates are produced during photosynthesis, a process in which carbon dioxide is converted into organic compounds as a way to store energy. This energy can be released when the carbohydrates are oxidized to generate carbon dioxide and water.

Despite their promise, the development and implementation of bio-based fuel technology has been slow. A number of reasons exist for this slow development. Ideally, a biofuel would be compatible with existing engine technology and have capability of being distributed through existing transportation infrastructure. Current industrial processes for biofuel formation are limited to fermentation of sugars and starches to ethanol, which competes with these materials as a food source. In addition, ethanol has a low energy density when used as a fuel. Although some compounds that have potential to serve as fuels can be produced from biomass resources (e.g., ethanol, methanol, biodiesel, Fischer-Tropsch diesel, and gaseous fuels, such as hydrogen and methane), these fuels generally require new distribution infrastructure and/or engine technologies to accommodate their physical characteristics. As noted above, there has yet to be developed an industrially scalable process that can convert biomass into fuel blends in a cost- and energy-efficient manner that are similar to fossil fuels.

SUMMARY

The present disclosure generally relates to the processing of cellulosic biomass solids using digestion to produce a hydrolysate, and, more specifically, to biomass conversion systems and methods that allow cellulosic fines to be removed via filtration from a hydrolysate produced during the digestion of cellulosic biomass solids.

In some embodiments, the present invention provides a method comprising: providing a biomass conversion system that comprises a fluid circulation loop comprising: a hydrothermal digestion unit; a solids separation unit that is in fluid communication with an outlet of the hydrothermal digestion unit; wherein the solids separation unit comprises a plurality of filters; and a catalytic reduction reactor unit that is in fluid communication with an outlet of the solids separation unit and an inlet of the hydrothermal digestion unit; providing a cellulosic biomass in the hydrothermal digestion unit; at least partially digesting the cellulosic biomass in the hydrothermal digestion unit to form a hydrolysate comprising soluble carbohydrates and cellulosic fines within a liquor phase; flowing the liquor phase through at least one of the filters to sequester the cellulosic fines; and backflushing at least a portion of the cellulosic fines to the hydrothermal digestion unit while the liquor phase continues to flow through one or more of the filters to the catalytic reduction reactor unit.

In some embodiments, the present invention provides a method comprising: providing a biomass conversion system that comprises a fluid circulation loop comprising: a hydrothermal digestion unit; a solids separation unit that is in fluid communication with an outlet of the hydrothermal digestion unit; wherein the solids separation unit comprises a plurality of filters; and a catalytic reduction reactor unit that is in fluid communication with an outlet of the solids separation unit and an inlet of the hydrothermal digestion unit; providing a cellulosic biomass in the hydrothermal digestion unit; at least partially digesting the cellulosic biomass in the hydrothermal digestion unit to form a hydrolysate comprising soluble carbohydrates and cellulosic fines within a liquor phase; flowing the liquor phase through at least one of the filters to sequester the cellulosic fines; at least partially converting the soluble carbohydrates into a reaction product in the catalytic reduction reactor unit; and backflushing at least a portion of the cellulosic fines to the hydrothermal digestion unit using at least a portion of the reaction product.

In some embodiments, the present invention provides a biomass conversion system comprising: a fluid circulation loop comprising: a hydrothermal digestion unit; a solids separation unit that is in fluid communication with an outlet of the hydrothermal digestion unit; wherein the solids separation unit comprises a plurality of filters; wherein the filters are in fluid communication with the fluid circulation loop in both a forward and a reverse flow direction; and a catalytic reduction reactor unit that is in fluid communication with an outlet of the solids separation unit and an inlet of the hydrothermal digestion unit; wherein at least one of the plurality of filters is in fluid communication with an inlet of the catalytic reduction reactor unit.

The features and advantages of the present invention will be readily apparent to one having ordinary skill in the art upon a reading of the description of the preferred embodiments that follows.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary in the art and the benefit of this disclosure.

DETAILED DESCRIPTION

Figure 1:
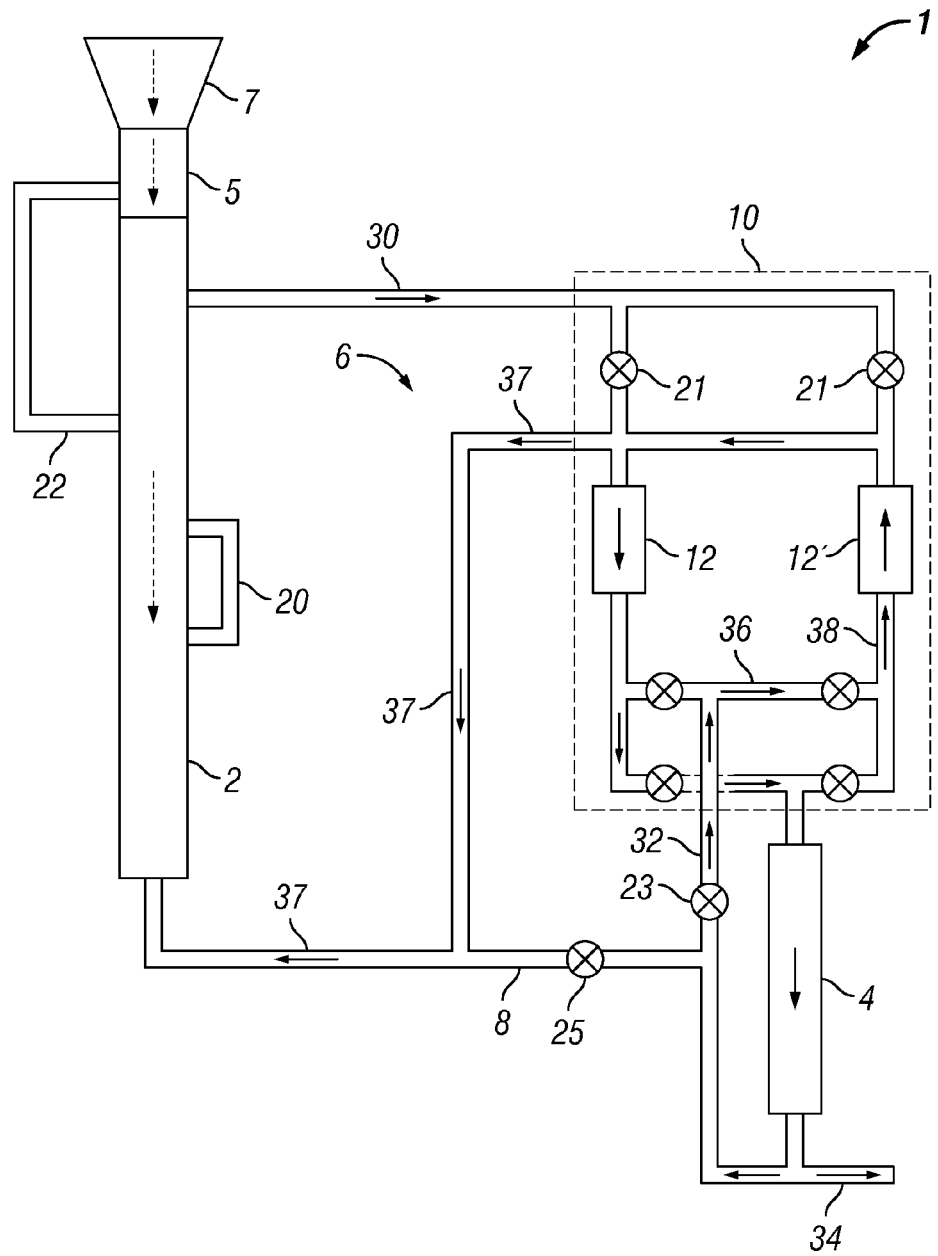
FIG. 1 shows a schematic of an illustrative biomass conversion system in which parallel filters are used to sequester cellulosic fines.

The present disclosure generally relates to the processing of cellulosic biomass solids using digestion to produce a hydrolysate, and, more specifically, to biomass conversion systems and methods that allow cellulosic fines to be removed via filtration from a hydrolysate produced during the digestion of cellulosic biomass solids.

Unless otherwise specified herein, it is to be understood that use of the term "biomass" in the description that follows refers to "cellulosic biomass solids." Solids may be in any size, shape, or form. The cellulosic biomass solids may be natively present in any of these solid sizes, shapes, or forms or may be further processed prior to digestion in the embodiments described herein. The cellulosic biomass solids may be present in a slurry form in the embodiments described herein.

In practicing the present embodiments, any type of suitable biomass source may be used. Suitable cellulosic biomass sources may include, for example, forestry residues, agricultural residues, herbaceous material, municipal solid wastes, waste and recycled paper, pulp and paper mill residues, and any combination thereof. Thus, in some embodiments, a suitable cellulosic biomass may include, for example, corn stover, straw, bagasse, miscanthus, sorghum residue, switch grass, bamboo, water hyacinth, hardwood, hardwood chips, hardwood pulp, softwood, softwood chips, softwood pulp, and any combination thereof. Leaves, roots, seeds, stalks, and the like may be used as a source of the cellulosic biomass. Common sources of cellulosic biomass may include, for example, agricultural wastes (e.g., corn stalks, straw, seed hulls, sugarcane leavings, nut shells, and the like), wood materials (e.g., wood or bark, sawdust, timber slash, mill scrap, and the like), municipal waste (e.g., waste paper, yard clippings or debris, and the like), and energy crops (e.g., poplars, willows, switch grass, alfalfa, prairie bluestream, corn, soybeans, and the like). The cellulosic biomass may be chosen based upon considerations such as, for example, cellulose and/or hemicellulose content, lignin content, growing time/season, growing location/transportation cost, growing costs, harvesting costs, and the like.

When converting biomass into industrial chemicals and fuel blends, the complex organic molecules therein need to be broken down into simpler molecules, which may be transformed into other compounds. For cellulosic biomass, the first step in this process is the production of soluble carbohydrates, typically by digestion. Digestion of cellulosic biomass may be conducted using an acid or base in a kraft-like process at low temperatures and pressures to produce a biomass pulp. These types of digestion processes are commonly used in the paper and pulpwood industry. According to the embodiments described herein, the digestion rate of cellulosic biomass may be accelerated in the presence of a digestion solvent at elevated temperatures and pressures that maintain the digestion solvent in a liquid state above its normal boiling point. In various embodiments, the digestion solvent may contain an organic solvent, particularly an in situ-generated organic solvent, which may provide particular advantages, as described hereinafter.

When a digestion solvent is used at high temperatures and pressures, the digestion process may become fairly energy intensive. If the energy input requirements for the digestion process become too great, the economic feasibility of cellulosic biomass as a feedstock material may be jeopardized. That is, if the energy input needed to digest cellulosic biomass is too great, processing costs may become higher than the actual value of the product being generated. In order to keep processing costs low, the amount of externally added heat input to the digestion process should be kept as low as possible while achieving as high as possible conversion of the cellulosic biomass into soluble carbohydrates.

The present disclosure provides systems and methods that allow cellulosic biomass to be efficiently digested to form soluble carbohydrates, which may subsequently be converted through one or more catalytic reduction reactions (e.g., hydrogenolysis and/or hydrogenation) into reaction products comprising oxygenated intermediates that may be further processed into higher hydrocarbons. The higher hydrocarbons may be useful in forming industrial chemicals and transportation fuels (i.e., a biofuel), including, for example, synthetic gasoline, diesel fuels, jet fuels, and the like. As used herein, the term "biofuel" will refer to any transportation fuel formed from a biological source.

As used herein, the term "soluble carbohydrates" refers to monosaccharides or polysaccharides that become solubilized in a digestion process. As used herein, the term "oxygenated intermediates" refers to alcohols, polyols, ketones, aldehydes, and mixtures thereof that are produced from a catalytic reduction reaction (e.g., hydrogenolysis and/or hydrogenation) of soluble carbohydrates. As used herein, the term "higher hydrocarbons" refers to hydrocarbons having an oxygen to carbon ratio less than that of at least one component of the biomass source from which they are produced. As used herein, the term "hydrocarbon" refers to an organic compound comprising primarily hydrogen and carbon, although heteroatoms such as oxygen, nitrogen, sulfur, and/or phosphorus may be present in some embodiments. Thus, the term "hydrocarbon" also encompasses heteroatom-substituted compounds containing carbon, hydrogen, and oxygen, for example.

Illustrative carbohydrates that may be present in cellulosic biomass may include, for example, sugars, sugar alcohols, celluloses, lignocelluloses, hemicelluloses, and any combination thereof. Once soluble carbohydrates have been removed from the biomass matrix through a digestion process according to the embodiments described herein, the soluble carbohydrates may be transformed into a reaction product comprising oxygenated intermediates via a catalytic reduction reaction. Until the soluble carbohydrates are transformed by the catalytic reduction reaction, they are very reactive and may be subject to degradation under the digestion conditions. For example, soluble carbohydrates may degrade into insoluble byproducts such as, for example, caramelans and other heavy ends degradation products that are not readily transformable by further reactions into a biofuel. Such degradation products may also be harmful to equipment used in the biomass processing. Thus, in some embodiments, the soluble carbohydrates and a digestion solvent may be circulated in a fluid circulation loop to remove them from the digestion conditions and convert them into less reactive oxygenated intermediates via a catalytic reduction reaction.

In some embodiments, the oxygenated intermediates may be further transformed into a biofuel using any combination of further hydrogenolysis reactions, hydrogenation reactions, condensation reactions, isomerization reactions, oligomerization reactions, hydrotreating reactions, alkylation reactions, and the like. In some embodiments, at least a portion of the oxygenated intermediates may be recirculated to the hydrothermal digestion unit to comprise at least a portion of the digestion solvent. Recirculation of at least a portion of the oxygenated intermediates to the hydrothermal digestion unit may also be particularly advantageous in terms of heat integration and process efficiency.

A significant issue for processing cellulosic biomass is the development of a mechanism and process by which a pressurized hydrothermal digestion unit may be continuously or semi-continuously supplied with fresh biomass. Without the ability to introduce fresh biomass to a pressurized hydrothermal digestion unit, depressurization and cooling of the hydrothermal digestion unit may take place during the addition of fresh biomass, significantly reducing the energy- and cost-efficiency of the conversion process. As used herein, the term "continuous addition" and grammatical equivalents thereof will refer to a process in which biomass is added to a hydrothermal digestion unit in an uninterrupted manner without fully depressurizing the hydrothermal digestion unit. As used herein, the term "semi-continuous addition" and grammatical equivalents thereof will refer to a discontinuous, but as-needed, addition of biomass to a hydrothermal digestion unit without fully depressurizing the hydrothermal digestion unit.

A leading advantage of the biomass conversion systems described herein is that the systems are designed to favor a high conversion of biomass into soluble carbohydrates, which may be subsequently processed into a biofuel. The biomass conversion systems and associated methods described herein are to be distinguished from those of the paper and pulpwood industry, where the goal is to harvest partially digested wood pulp, rather than obtaining as high as possible a quantity of soluble carbohydrates. In some embodiments, at least about 60% of the cellulosic biomass, on a dry basis, may be digested to produce a hydrolysate comprising soluble carbohydrates. In other embodiments, at least about 90% of the cellulosic biomass, on a dry basis, may be digested to produce a hydrolysate comprising soluble carbohydrates. The design of the present systems may enable such high conversion rates by minimizing the formation of degradation products during the processing of biomass.

A significant issue that may be encountered when digesting cellulosic biomass, particularly high conversion digestion to produce a hydrolysate, is that cellulosic fines may be produced within a liquor phase of the hydrolysate. As cellulosic biomass breaks apart during digestion, smaller and smaller particulates may be produced until only insoluble materials remain. Cellulosic fines may also be present in native cellulosic biomass before digestion takes place. The cellulosic fines may still contain significant quantities of digestable cellulose materials. The increasingly small cellulosic fines may remain inside the digestion unit to undergo further digestion. A screen may be used at a fluid exit of the digestion unit in order to assist in maintaining the cellulosic fines therein. At a certain size, the cellulosic fines may become so small that they are transported by liquor phase fluid flow. If the cellulosic fines become sufficiently small, they may pass through the screen on the digestion unit and enter other portions of the biomass conversion system. As used herein, the term "cellulosic fines" will refer to cellulosic biomass particles that are mobile in a liquor phase and sufficiently small to pass through a screen. The cellulosic fines may be of any shape and have a nominal size less than the nominal size of the biomass fed to the digestion unit. In some embodiments, the biomass fed to the digestion unit may have a nominal particle size ranging between about 0.5 inches and about 2 inches, with some particles being 3 to 4 inches in size or larger. In some embodiments, cellulosic fines may be around 1 micron in size or smaller, more typically between about 1 micron and about 100 microns. In some embodiments, cellulosic fines as large as about 1 mm may be transported out of the digestion unit via fluid flow.

Production of cellulosic fines may be particularly problematic from an operational standpoint during the processing of cellulosic biomass. Cellulosic fines may plug fluid flow pathways in the biomass conversion systems. They may be particularly deleterious to reactor units (e.g., catalytic reduction reactor units used to reduce soluble carbohydrates into oxygenated intermediates), where they may plug the reactor and/or damage the catalyst. In addition, if not recovered and further digested, the cellulosic fines represent a lost source of cellulosic biomass that remains unconverted into soluble carbohydrates for subsequent transformation into other materials, particularly if they become deposited in a low temperature zone where further digestion does not proceed at an appreciable rate.

It is to be noted that production of cellulosic fines is not believed to be problematic in biomass digestion processes in which the goal is to produce biomass pulp, such as in kraft-type digestion in the paper and pulpwood industry. In digestion processes of these types, the digestion may not proceed to a degree needed to reduce the biomass particulate size sufficiently to produce cellulosic fines.

The present disclosure addresses the foregoing difficulty in the art by providing a mechanism through which cellulosic fines may be removed from a liquor phase and subsequently returned to the digestion unit, if desired. The removal of cellulosic fines from the liquor phase and their return to the digestion unit not only may protect the components of the biomass conversion systems from particulate deposition damage, but it also may allow a greater percentage of the cellulosic biomass charge to be digested to form a hydrolysate. If significant quantities of the cellulosic fines remain undigested, a lower yield of soluble carbohydrates may be obtained during digestion.

Another advantageous feature of the present biomass conversion systems is that the removal and return of cellulosic fines to the digestion unit may take place while high pressure digestion is occurring. That is, the digestion unit may be operated continuously while cellulosic fines are being returned thereto, such that digestion may continue in a substantially uninterrupted manner. This feature may improve the energy efficiency of the digestion process by not having to cool and depressurize the digestion unit during fines removal or return. It should be noted, however, that in alternative embodiments, the cellulosic fines may be removed from the biomass conversion systems, if desired, and/or the return of cellulosic fines to the digestion unit may take place while continuous digestion is not occurring.

As still another advantage, the present biomass conversion systems may be configured such that fresh biomass may be continuously or semi-continuously supplied to the digestion unit, such that the digestion unit may operate continuously at elevated temperatures and pressures. That is, the biomass conversion systems may be configured such that biomass may be added to a pressurized digestion system. A further description of biomass feed mechanisms that may supply biomass to a pressurized digestion unit are described in more detail below.

A further optional advantage of the present biomass conversion systems involves operation of a solids separation unit therein at a temperature sufficient to enable continued digestion of cellulosic fines to form soluble carbohydrates and lignin. That is, the solids separation unit can provide additional residence time for digestion of cellulosic fines. By allowing digestion to continue in the solids separation unit, fewer regeneration operations can be needed to remove and recover cellulosic fines. Further, the solids separation unit can be operated catalytically to enable some conversion of soluble carbohydrates to occur therein before they are passed to a catalytic reduction reactor unit.

In some embodiments, biomass conversion systems described herein can comprise:

a fluid circulation loop comprising: a hydrothermal digestion unit; a solids separation unit that is in fluid communication with an outlet of the hydrothermal digestion unit; wherein the solids separation unit comprises a plurality of filters; wherein the filters are in fluid communication with the fluid circulation loop in both a forward and a reverse flow direction; and a catalytic reduction reactor unit that is in fluid communication with an outlet of the solids separation unit and an inlet of the hydrothermal digestion unit; wherein at least one of the plurality of filters is in fluid communication with an inlet of the catalytic reduction reactor unit. In such a configuration, at least one of the filters can be backflushed to remove cellulosic fines therefrom, while one or more of the other filters remain in fluid communication with an inlet of the catalytic reduction reactor unit. That is, the filters are configured such that they can be operated in a reciprocating manner in the embodiments described herein.

As used herein, the term "plurality of filters" refers to 2 or more filters. In some embodiments, the plurality of filters may be connected in parallel to one another. In other embodiments, the plurality of filters may be arranged on a rotatable filter array. In each of these embodiments, at least one of the filters may be backflushed while fluid flow continues through at least one of the remaining filters in a forward flow direction. In such arrangements of the plurality of filters, the biomass conversion systems are capable of continually producing a reaction product in the catalytic reduction reactor unit. It is to be noted that in some alternative embodiments, each of the plurality of filters may be backflushed at the same time, such that hydrolysate flow to the catalytic reduction reactor unit is interrupted. If performed for a short time, such a flow interruption may not substantially upset the biomass conversion process. In still another alternative configuration, a single filter may be used, with more frequent backflushing taking place.

The plurality of filters used in the present embodiments may be of any type capable of affecting separation of solids from a fluid phase. Suitable filters may include, for example, surface filters and depth filters. Surface filters may include, for example, filter papers, membranes, porous solid media, and the like. Depth filters may include, for example, a column or plug of porous media designed to trap solids within its core structure.

In some embodiments, the fluid circulation loop may be configured to establish countercurrent flow in the hydrothermal digestion unit. As used herein, the term "countercurrent flow" refers to the direction a reaction product enters the hydrothermal digestion unit relative to the direction in which biomass is introduced to the digestion unit. Other flow configurations such as, for example, co-current flow may also be used, if desired. In some embodiments, at least one of the plurality of filters may be in fluid communication with an outlet of the catalytic reduction reactor unit. In such embodiments, at least a portion of a reaction product produced in the catalytic reduction reactor unit may be used to backflush the one or more filters of the solids separation unit.

In some embodiments, at least one of the filters of the solids separation unit may comprise a catalytic filter. Such catalytic filters may comprise a solid support and a catalyst on the solid support. For example, in some embodiments, the solid support may comprise one or more of the foregoing types of filtration media. In general, any type of heterogeneous catalyst may be deposited on the solid support. In some embodiments, the catalyst on the solid support may be capable of activating molecular hydrogen. As described hereinafter, such catalysts may be used to transform soluble carbohydrates into a reaction product comprising oxygenated intermediates in the catalytic reduction reactor unit. For example, such catalysts may be used to perform a hydrogenolysis and/or hydrogenation reaction of the soluble carbohydrates by supplying molecular hydrogen to the filters. By including a catalyst on at least one of the filters, a greater effective transformation of soluble carbohydrates into a reaction product may be realized. As a further advantage, by operating the filters at an elevated temperature, the filters may be made to be "self-healing" whereby materials plugging the filter may be further digested to produce soluble carbohydrates and reduce the frequency needed for filter regeneration.

In some embodiments, the hydrothermal digestion unit may be, for example, a pressure vessel of carbon steel, stainless steel, or a similar alloy. In some embodiments, a single hydrothermal digestion unit may be used. In other embodiments, multiple hydrothermal digestion units operating in series, parallel or any combination thereof may be used. In some embodiments, digestion may be conducted in a pressurized hydrothermal digestion unit operating continuously. However, in other embodiments, digestion may be conducted in batch mode. Suitable hydrothermal digestion units may include, for example, the "PANDIA™ Digester" (Voest-Alpine Industrienlagenbau GmbH, Linz, Austria), the "DEFIBRATOR Digester" (Sunds Defibrator AB Corporation, Stockholm, Sweden), the M&D (Messing & Durkee) digester (Bauer Brothers Company, Springfield, Ohio, USA) and the KAMYR Digester (Andritz Inc., Glens Falls, N.Y., USA). In some embodiments, the biomass may be at least partially immersed in the hydrothermal digestion unit. In other embodiments, the hydrothermal digestion unit may be operated as a trickle bed or pile-type hydrothermal digestion unit. Fluidized bed and stirred contact hydrothermal digestion units may also be used in some embodiments. Suitable hydrothermal digestion unit designs may include, for example, co-current, countercurrent, stirred tank, or fluidized bed hydrothermal digestion units.

In general, digestion may be conducted in a liquor phase. In some embodiments, the liquor phase may comprise a digestion solvent that comprises water. In some embodiments, the liquor phase may further comprise an organic solvent. In some embodiments, the organic solvent may comprise oxygenated intermediates produced from a catalytic reduction reaction of soluble carbohydrates. For example, in some embodiments, a digestion solvent may comprise oxygenated intermediates produced by a hydrogenolysis reaction or other catalytic reduction reaction of soluble carbohydrates. In some embodiments, bio-ethanol may be added to water as a startup digestion solvent, with a solvent comprising oxygenated intermediates being produced thereafter. Any other organic solvent that is miscible with water may also be used as a startup digestion solvent, if desired. In general, a sufficient amount of liquor phase is present in the digestion process such that the biomass surface remains wetted. The amount of liquor phase may be further chosen to maintain a sufficiently high concentration of soluble carbohydrates to attain a desirably high reaction rate during subsequent catalytic reduction, but not so high such that degradation becomes problematic. In some embodiments, the concentration of soluble carbohydrates may be kept below about 5% by weight of the liquor phase to minimize degradation. However, it is to be recognized that higher concentrations may be used in some embodiments. In some embodiments, organic acids such as, for example, acetic acid, oxalic acid, acetylsalicylic acid, and acetylsalicylic acid may be included in the liquor phase as an acid promoter of the digestion process.

In some embodiments, prior to digestion, the cellulosic biomass may be washed and/or reduced in size (e.g., by chopping, crushing, debarking, and the like) to achieve a desired size and quality for being digested. The operations may remove substances that interfere with further chemical transformation of soluble carbohydrates and/or improve the penetration of digestion solvent into the biomass. In some embodiments, washing may occur within the hydrothermal digestion unit prior to pressurization. In other embodiments, washing may occur before the biomass is placed in the hydrothermal digestion unit.

In some embodiments, the digestion solvent may comprise oxygenated intermediates of an in situ generated organic solvent. As used herein, the term "in situ generated organic solvent" refers to the reaction product produced from a catalytic reduction reaction of soluble carbohydrates, where the catalytic reduction reaction takes place in a catalytic reduction reactor unit coupled to the biomass conversion system. In some embodiments, the in situ generated organic solvent may comprise at least one alcohol, ketone, or polyol. In alternative embodiments, the digestion solvent may be at least partially supplied from an external source. For example, in an embodiment, bio-ethanol may be used to supplement the in situ-generated organic solvent. Other water-miscible organic solvents may be used as well. In some embodiments, the digestion solvent may be separated, stored, or selectively injected into the hydrothermal digestion unit so as to maintain a desired concentration of soluble carbohydrates.

In some embodiments, digestion may take place over a period of time at elevated temperatures and pressures. In some embodiments, digestion may take place at a temperature ranging between about 100° C. to about 240° C. for a period of time. In some embodiments, the period of time may range between about 0.25 hours and about 24 hours. In some embodiments, the digestion to produce soluble carbohydrates may occur at a pressure ranging between about 1 bar (absolute) and about 100 bar.

In various embodiments, suitable biomass digestion techniques may include, for example, acid digestion, alkaline digestion, enzymatic digestion, and digestion using hot-compressed water.

Various factors may influence the digestion process. In some embodiments, hemicellulose may be extracted from the biomass at temperatures below about 160° C. to produce a predominantly $C_5$ carbohydrate fraction. At increasing temperatures, this $C_5$ carbohydrate fraction may be thermally degraded. It may therefore be advantageous to convert the $C_5$ and/or $C_6$ carbohydrates and/or other sugar intermediates into more stable intermediates such as sugar alcohols, alcohols, and polyols. By reacting the soluble carbohydrates in a catalytic reduction reactor unit and recycling at least a portion of the reaction product to the hydrothermal digestion unit, the concentration of oxygenated intermediates may be increased to commercially viable concentrations while the concentration of soluble carbohydrates is kept low.

In some embodiments, cellulose digestion may begin above about 160° C., with solubilization becoming complete at temperatures around about 190° C., aided by organic acids (e.g., carboxylic acids) formed from partial degradation of carbohydrate components. Some lignins may be solubilized before cellulose, while other lignins may persist to higher temperatures. These lignins may optionally be removed at a later time. The digestion temperature may be chosen so that carbohydrates are solubilized while limiting the formation of degradation products.

In some embodiments, a plurality of hydrothermal digestion units may be used. In such embodiments, the biomass may first be introduced into a hydrothermal digestion unit operating at about 160° C. or below to solubilize $C_5$ carbohydrates and some lignin without substantially degrading these products. The remaining biomass may then exit the first hydrothermal digestion unit and pass to a second hydrothermal digestion unit. The second hydrothermal digestion unit may be used to solubilize $C_6$ carbohydrates at a higher temperature. In another embodiment, a series of hydrothermal digestion units may be used with an increasing temperature profile so that a desired carbohydrate fraction is solubilized in each.

In some embodiments, the biomass conversion systems may further comprise a biomass feed mechanism that is operatively coupled to the hydrothermal digestion unit and allows a cellulosic biomass to be continuously or semi-continuously added to the hydrothermal digestion unit without the hydrothermal digestion unit being fully depressurized. In some embodiments, the biomass feed mechanism may comprise a pressurization zone. Cellulosic biomass may be pressurized using the pressurization zone and then introduced to the hydrothermal digestion unit in a continuous or semi-continuous manner without fully depressurizing the digestion unit. Pressurizing the cellulosic biomass prior to its introduction to the hydrothermal digestion unit may allow the digestion unit to remain pressurized and operating continuously during biomass addition. Additional benefits of pressurizing the biomass prior to digestion are also discussed hereinafter. As used herein, the term "continuous addition" and grammatical equivalents thereof will refer to a process in which biomass is added to a digestion unit in an uninterrupted manner without fully depressurizing the digestion unit. As used herein, the term "semi-continuous addition" and grammatical equivalents thereof will refer to a discontinuous, but as-needed, addition of biomass to a digestion unit without fully depressurizing the digestion unit.

In some embodiments, the biomass conversion systems may further comprise a loading mechanism that is operatively connected to the pressurization zone. Any type of loading mechanism capable of dropping or transporting cellulosic biomass may be used in the present embodiments. Suitable loading mechanisms may include, for example, conveyer belts, vibrational tube conveyers, screw feeders or conveyers, bin dispensers, and the like. It is to be recognized that in some embodiments, the loading mechanism may be omitted. For example, in some embodiments, addition of cellulosic biomass to the pressurization zone may take place manually. In some embodiments, the cellulosic biomass may be provided and introduced to the pressurization zone at the same time. That is, a loading mechanism need not necessarily be used.

During the operation of the biomass conversion systems, the pressurization zone may cycle between a pressurized state and an at least partially depressurized state, while the hydrothermal digestion unit remains continuously operating in a pressurized state. While the pressurization zone is at least partially depressurized, cellulosic biomass may be introduced to the pressurization zone via the loading mechanism, if used. Suitable types of pressurization zones and operation thereof are described in commonly owned U.S. Patent Application Ser. Nos. 61/576,664 and 61/576,691, each filed concurrently herewith and incorporated herein by reference in its entirety.

In some embodiments, the cellulosic biomass within the pressurization zone may be pressurized, at least in part, by introducing at least a portion of the liquor phase in the hydrothermal digestion unit to the pressurization zone. In some or other embodiments, the cellulosic biomass within the pressurization zone may be pressurized, at least in part, by introducing a gas to the pressurization zone. In some embodiments, the liquor phase may comprise an organic solvent, which is generated as a reaction product of the catalytic reduction reactor unit. In other embodiments, an external solvent may be used to pressurize the pressurization zone.

At least two benefits may be realized by pressurizing the biomass in the presence of the liquor phase from the hydrothermal digestion unit. First, pressurizing the biomass in the presence of the liquor phase may cause the digestion solvent to infiltrate the biomass, which causes the biomass to sink in the digestion solvent once introduced to the digestion solvent. Further, by adding hot liquor phase to the biomass in the pressurization zone, less energy needs to be input to bring the biomass up to temperature once introduced to the hydrothermal digestion unit. Both of these features may improve the efficiency of the digestion process.

In some embodiments, the present biomass conversion systems may further comprise a phase separation mechanism in fluid communication with an outlet of the catalytic reduction reactor unit. Suitable phase separation mechanisms may include for, example, phase separation, solvent stripping columns, extractors, filters, distillations and the like. In an embodiment, azeotropic distillation may be conducted. In some embodiments, the phase separation mechanism may be used to separate an aqueous phase and an organic phase of the reaction product. In some embodiments, at least a portion of the aqueous phase may be recirculated to the hydrothermal digestion unit and/or be used to transport cellulosic fines back to the digestion unit. In some or other embodiments, at least a portion of the organic phase may be removed from the fluid circulation loop and subsequently be converted into a biofuel, as described hereinafter. In some embodiments, at least a portion of the organic phase may be recirculated to the digestion unit.

The biomass conversion systems of the foregoing description will now be further described with reference to the drawings. FIG. 1 shows a schematic of an illustrative biomass conversion system 1 in which parallel filters are used to sequester cellulosic fines. Biomass conversion system 1 contains hydrothermal digestion unit 2, solids separation unit 10, and catalytic reduction reactor unit 4, which together comprise fluid circulation loop 6. Within solids separation unit 10 are contained filters 12 and 12', one of which may be backflushed to remove particulate matter while the other continues operating in a forward flow direction. Filters 12 and 12' are in fluid communication with fluid circulation loop 6 in both the forward and reverse flow direction. Accordingly, filters 12 and 12' are reversible filters and may be operated in a reciprocating manner. As used herein, the term "reciprocating filters" refers to two or more filters, where one filter is operating in a forward flow direction and one filter is operating in a reverse flow direction, and where the flow direction of the two filters is changed together. Although FIG. 1 has depicted only two parallel filters, it is to be recognized that any number of parallel filters greater than or equal to two may also be used in accordance with the embodiments presented in FIG. 1. As described above, one filter may be used in an alternative configuration, but this may result in an interruption of liquor phase flow to catalytic reduction reactor unit 4.

The direction of fluid flow in biomass conversion system 1 is indicated with arrows in FIG. 1, where one of the parallel filters is being backflushed with reverse flow and one of the parallel filters continues operating with forward flow. It is to be recognized that, in some embodiments, both filters may be operating in a forward flow mode. That is, it is not necessarily the case that backflushing continually takes place. In some embodiments, the parallel filters may be bypassed, and a reaction product from catalytic reduction reactor unit 4 may be recirculated directly to hydrothermal digestion unit 2 by line 8.

Optional line 20 may be used to recirculate the liquor phase within the digestion unit. Reasons why one would want to include line 20 may include, for example, to maintain linear velocity of the liquor phase in the digestion unit and/or to further manage the temperature profile in digestion unit 2. Optional line 22 may be used to transfer liquor phase from the digestion unit. For example, line 22 may be used to transfer liquor phase from the digestion unit, where the liquor phase may at least partially pressurize pressurization zone 5. Cellulosic biomass may be supplied to pressurization zone 5 from loading mechanism 7 before pressurizing and introduction of the pressurized biomass to hydrothermal digestion unit 2.

In the operation of biomass conversion system 1, cellulosic biomass within hydrothermal digestion unit 2 may be at least partially digested to produce a hydrolysate comprising soluble carbohydrates within a liquor phase. As described herein, hydrothermal digestion unit 2 may be operated at elevated temperatures and pressures that facilitate the digestion of the biomass. The liquor phase may then be transferred to solids separation unit 10 via line 30. As greater quantities of the cellulosic biomass are digested, cellulosic fines may be present in the liquor phase of the hydrolysate.

Control of the liquor phase within solids separation unit 10 may be controlled by various valves 21. The position of valves 21 in FIG. 1 should be considered illustrative in nature and non-limiting, as other valves may be present, fewer valves may be used, and/or valves may be located in other positions. As depicted in FIG. 1, the valves are configured such that the liquor phase flows through filter 12 to catalytic reduction reactor unit 4. Within catalytic reduction reactor unit 4, soluble carbohydrates may be transformed into a reaction product. In some embodiments, lignins may also be transformable into a reaction product. For example, the soluble carbohydrates may undergo a catalytic reduction reaction (e.g., a hydrogenolysis and/or hydrogenation reaction) to produce a reaction product comprising oxygenated intermediates. If desired, at least a portion of the reaction product may be used to backflush solids separation unit 10, where the reaction product enters solids separation unit 10 via line 32. Alternatively, solids separation unit 10 may be backflushed with a solvent from an external source. In still another alternative configuration, line 8 may be used to transfer at least a portion of the reaction product back to hydrothermal digestion unit 2, while bypassing solids separation unit 10. Fluid flow within lines 8 and 32 may be regulated with valves 23 and 25. Reaction product not recirculated to hydrothermal digestion unit 2 and/or solids separation unit 10 may be removed by line 34 for further transformation into a biofuel or other material.

The direction of biomass introduction into hydrothermal digestion unit 2 and flow of bulk biomass therein is indicated by a dashed arrow. Cellulosic fines may flow upward in the flow of digestion solvent. As depicted in FIG. 1, line 37 of fluid circulation loop 6 is configured such that countercurrent flow is established in hydrothermal digestion unit 2. It is to be recognized, however, that other flow configurations may be used, including co-current flow, by connecting line 37 to another point in hydrothermal digestion unit 2.

When valve 23 is open, the reaction product may reenter solids separation unit 10 via line 32 for backflushing at least one of the parallel filters. As depicted in FIG. 1, the reaction product in line 32 may flow to filter 12' in a reverse direction via lines 36 and 38. While filter 12' is being backflushed, liquor phase continues to flow through filter 12 to catalytic reduction reactor unit 4.

By backflushing filter 12', cellulosic fines or other particulate matter thereon may be recirculated to hydrothermal digestion unit 2 via line 37. Once the cellulosic fines have been removed from filter 12', the direction of fluid flow through this filter may then be reversed. In some embodiments, after the fluid flow direction through filter 12' has been reversed, the fluid flow direction through filter 12 may also be changed, and this filter may then be similarly backflushed. In alternative embodiments, both filters 12 and 12' may be flowed in the forward direction to feed catalytic reduction reactor unit 4 for at least some period of time.

The decision to reverse the flow direction through the parallel filters and backflush the cellulosic fines may take place in response to any type of trigger event. In some embodiments, backflushing may take place at a fixed time interval. In some embodiments, backflushing may take place if the forward fluid flow rate through the filters drops below a pre-determined level. In some embodiments, backflushing may take place if the pressure drop for a fixed fluid flow rate through the filter increases above a designated value. In still other embodiments, backflushing may take place in response to the height of a filter cake deposited on the filters. Reversal of the fluid flow direction may take place manually in some embodiments, automatically in some embodiments, or any combination thereof.

Figure 2:
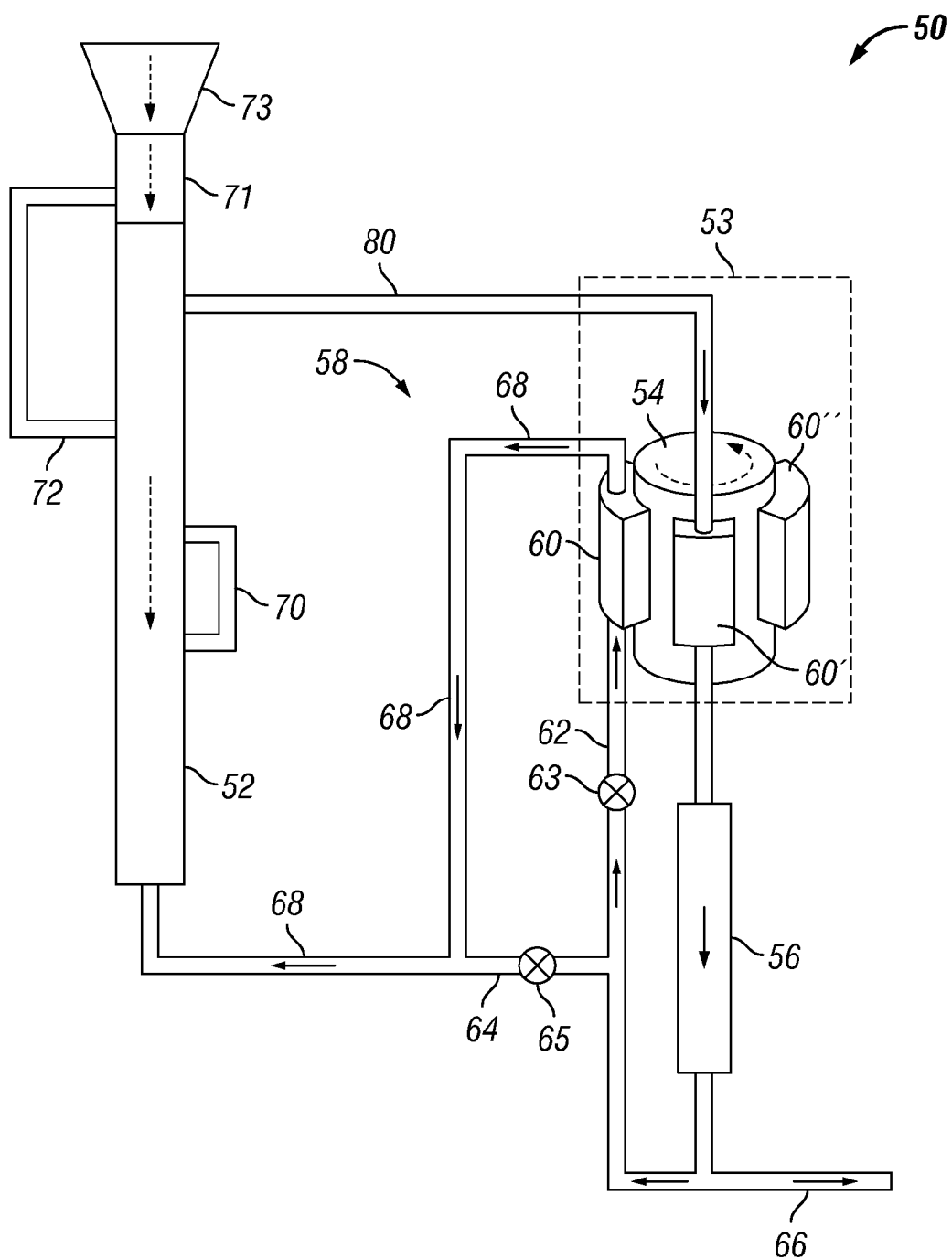
FIG. 2 shows a schematic of an illustrative biomass conversion system in which a rotatable filter array is used to sequester cellulosic fines.

FIG. 2 shows a schematic of an illustrative biomass conversion system 50 in which a rotatable filter array is used to sequester cellulosic fines. This biomass conversion system embodies many of the features described in more detail above for FIG. 1, so they will be described only in brief in the description that follows. Biomass conversion system 50 contains hydrothermal digestion unit 52, solids separation unit 53 containing rotatable filter array 54, and catalytic reduction reactor unit 56, which collectively comprise fluid circulation loop 58. Rotatable filter array 54 contains filters 60, 60', and 60", at least one of which may be backflushed with reverse fluid flow to remove particulate matter while at least another one of which may continue operating with forward fluid flow. Although FIG. 2 has depicted only three filters within rotatable filter array 54, it is to be recognized that any number of filters greater than or equal to two may employed in embodiments where a rotatable filter array is used.

The direction of fluid flow is indicated with arrows in FIG. 2. As depicted in FIG. 2, liquor phase flows from hydrothermal digestion unit 52 through line 80 to solids separation unit 53. Fluid flow continues in the forward direction through filter 60' to catalytic reduction reactor unit 56 while filter 60 is being backflushed with reverse fluid flow. As depicted in FIG. 2, filter 60" is not in use. Although FIG. 2 has depicted only two filters being used at the same time, more than two filters may be in simultaneous use, if desired. For example, by splitting the fluid flow (not shown), more than one filter may be used in the forward or reverse flow direction.

Once the liquor phase flows through filter 60' to remove cellulosic fines on the filtration medium, the liquor phase flows to catalytic reduction reactor unit 56 to produce a reaction product comprising oxygenated intermediates. As above, this reaction product may be used to backflush solids separation unit 53 via line 62 and/or recirculated to digestion unit 52 via line 64. Valves 63 and 65 may be used to control fluid flow within lines 62 and 64. The position of these valves should be considered illustrative in nature, and other valves may be present, if desired. In alternative embodiments, an external solvent may be used to backflush solids separation unit 53, if desired. Cellulosic fines on filter 60 may be returned to digestion unit 52 via line 68. At least a portion of the reaction product may be removed from biomass conversion system 50 via line 66 and subjected to further chemical transformations.

In the embodiment depicted in FIG. 2, once a desired amount of cellulosic fines have been removed from filter 60 by backflushing, this filter may be placed back into service by turning rotatable filter array 54. Turning of rotatable filter array 54 places another filter (e.g., filter 60") in a position for backflushing. Turning of rotatable filter array 54 in the opposite direction would place filter 60' in a position for backflushing and place filter 60" in the forward fluid flow.

As described in more detail for FIG. 1, optional line 70 may be used to recirculate the liquor phase within the digestion unit, and optional line 72 may be used to transfer liquor phase from the digestion unit. For example, the liquor phase may be used to at least partially pressurize pressurization zone 71. Cellulosic biomass may be supplied to pressurization zone 71 from loading mechanism 73 before pressurizing and introduction of the pressurized biomass to hydrothermal digestion unit 52. Likewise, line 68 may be configured such that countercurrent flow is established within hydrothermal digestion unit 52, where the direction of biomass introduction into digestion unit 52 and the flow of bulk biomass therein is indicated by dashed arrows.

In some embodiments, methods for processing biomass are described herein. In some embodiments, the methods can comprise: providing a biomass conversion system that comprises a fluid circulation loop comprising: a hydrothermal digestion unit; a solids separation unit that is in fluid communication with an outlet of the hydrothermal digestion unit; wherein the solids separation unit comprises a plurality of filters; and a catalytic reduction reactor unit that is in fluid communication with an outlet of the solids separation unit and an inlet of the hydrothermal digestion unit; providing a cellulosic biomass in the hydrothermal digestion unit; at least partially digesting the cellulosic biomass in the hydrothermal digestion unit to form a hydrolysate comprising soluble carbohydrates and cellulosic fines within a liquor phase; flowing the liquor phase through at least one of the filters to sequester the cellulosic fines; and backflushing at least a portion of the cellulosic fines to the hydrothermal digestion unit while the liquor phase continues to flow through one or more of the filters to the catalytic reduction reactor unit.

In some embodiments, methods for processing biomass can comprise: providing a biomass conversion system that comprises a fluid circulation loop comprising: a hydrothermal digestion unit; a solids separation unit that is in fluid communication with an outlet of the hydrothermal digestion unit; wherein the solids separation unit comprises a plurality of filters; and a catalytic reduction reactor unit that is in fluid communication with an outlet of the solids separation unit and an inlet of the hydrothermal digestion unit; providing a cellulosic biomass in the hydrothermal digestion unit; at least partially digesting the cellulosic biomass in the hydrothermal digestion unit to form a hydrolysate comprising soluble carbohydrates and cellulosic fines within a liquor phase; flowing the liquor phase through at least one of the filters to sequester the cellulosic fines; at least partially converting the soluble carbohydrates into a reaction product in the catalytic reduction reactor unit; and backflushing at least a portion of the cellulosic fines to the hydrothermal digestion unit using at least a portion of the reaction product.

In some embodiments, the methods may further comprise forming a reaction product in the catalytic reduction reactor unit. In some embodiments, at least a portion of the reaction product produced in the catalytic reduction reactor unit may be used to backflush the cellulosic fines sequestered on the filter. In other embodiments, an external solvent may be used to backflush the cellulosic fines sequestered on the filter. In some embodiments, at least a portion of the reaction product may be recirculated to the hydrothermal digestion unit without being used to backflush a filter, if desired. Optionally, any hydrogen in the reaction product may be removed therefrom prior to being used to backflush the solids separation unit and/or being recirculated to the hydrothermal digestion unit.

In some embodiments, at least one of the plurality of filters may comprise a catalytic filter that comprises a solid support and a catalyst that is capable of activating molecular hydrogen. In some embodiments, the methods may further comprise at least partially converting soluble carbohydrates into a reaction product on the catalytic filter. Particular advantages of such an approach have been described hereinabove. In some embodiments, the soluble carbohydrates may be further converted into a reaction product in the catalytic reduction reactor unit. In some embodiments, the hydrolysate may be converted into a reaction product, which may subsequently be converted into a biofuel.

In some embodiments, the methods may further comprise reversing the direction of fluid flow in at least some of the filters. As described above, reversing the direction of fluid flow may remove cellulosic fines from the filters. In some embodiments, the methods may comprise reversing a direction of fluid flow in the filters that are being backflushed, and reversing a direction of fluid flow in one or more of the other filters so as to backflush cellulosic fines therefrom. For example, a filter that was previously being backflushed may be flowed in the forward direction and a filter that was previously being used to sequester cellulosic fines may be backflushed by reversing the direction of fluid flow.

Solids separation units comprising separation mechanisms other than filters may also be used in alternative embodiments of the present disclosure to affect removal of cellulosic fines from the liquor phase being produced from digestion. In some embodiments, at least one liquid-solid settling tank may be used to separate the cellulosic fines from the liquor phase obtained from the hydrothermal digestion unit. In some embodiments, a centrifuge may be used to separate cellulosic fines from the liquor phase. In some embodiments, a centripetal force-based separation mechanism may be used in place of the plurality of filters used in the previously described embodiments. Such centripetal force-based separation mechanisms are also commonly referred to in the art as centrifugal force-based separation mechanisms and/or vortex-based separation mechanisms. In the description that follows, the term "centripetal force-based separation mechanism" will be used for simplicity, but it is to be understood that this term may also represent a similar centrifugal force-based separation mechanism or vortex-based separation mechanism. In some embodiments, a suitable centripetal force-based separation mechanism may comprise a hydroclone (also known in the art as a hydrocyclone).

The design and operation of a hydroclone will be familiar to one having ordinary skill in the art. As one of ordinary skill in the art will recognize, a hydroclone contains a fluid inlet in which a solids-containing fluid enters a chamber within the hydroclone. Once in the chamber, the fluid and solids may undergo rotational motion, thereby resulting in at least partial separation of the solids from the fluid phase. The hydroclone may further contain separate outlets for the fluid phase and the separated solids. Since the solids are typically more dense than the fluid phase, the solids outlet is usually located at the bottom of the hydroclone and the fluid outlet is usually located at the top.

Use of a hydroclone in place of a plurality of filters may present particular advantages in the present embodiments. Since solids separation takes place as part of the hydroclone's design, no backflushing is needed to remove solids from the solids separation unit. This feature makes the biomass conversion systems operationally simpler. Further, since there are no moving parts in a hydroclone, the risk of mechanical failure may be reduced. As in the embodiments where a plurality of filters are used in the solids separation unit, cellulosic fines may also be returned to the digestion unit in embodiments where a hydroclone is used as well.

In some embodiments, biomass conversion systems can comprise: a fluid circulation loop comprising: a hydrothermal digestion unit; a solids separation unit that is in fluid communication with an outlet of the hydrothermal digestion unit; wherein the solids separation unit comprises a centripetal force-based separation mechanism that comprises a fluid outlet and a solids outlet; and a catalytic reduction reactor unit that is in fluid communication with the fluid outlet of the centripetal force-based separation mechanism and an inlet of the hydrothermal digestion unit. In some embodiments, the centripetal force-based separation mechanism may comprise a hydroclone.

In some cases, a centripetal force-based separation mechanism may not remove the smallest cellulosic fines from the liquor phase. In the event that the centripetal force-based separation mechanism fails to remove all the cellulosic fines, two or more centripetal force-based separation mechanisms may be used in series, or another secondary separation mechanism may be used after the centripetal force-based separation mechanism. For example, in some embodiments, at least one filter may be present between the solids separation unit and the catalytic reduction reactor unit. This filter may provide a secondary separation of cellulosic fines before the liquor phase enters the catalytic reduction reactor unit.

In some embodiments, the biomass conversion systems may further comprise a solids collection unit that is operatively coupled to the solids outlet of the centripetal force-based separation mechanism. Cellulosic fines collected in the solids collection unit may either be discarded or preferably returned to the hydrothermal digestion unit. In alternative embodiments, the solids collection unit may be omitted, and the solids outlet of the centripetal force-based separation may be in direct operative coupling with the hydrothermal digestion unit or the fluid circulation loop, such that separated cellulosic fines may be returned to the hydrothermal digestion unit.

In some embodiments, the biomass conversion systems may further comprise a return line establishing fluid communication between the solids collection unit and the fluid circulation loop. In some embodiments, a reaction product produced in the catalytic reduction reactor unit may be used to transport the collected cellulosic fines to the hydrothermal digestion unit. In other embodiments, an externally added solvent may be used to transport the cellulosic fines to the hydrothermal digestion unit. In some embodiments, the biomass conversion systems may further comprise a fluid transfer line that establishes fluid communication between an outlet of the catalytic reduction reactor unit and a solids collection unit.

In some embodiments, the fluid circulation loop of biomass conversion systems containing a centripetal force-based separation mechanism may be configured to establish countercurrent flow in the hydrothermal digestion unit. As described above, other flow configurations such as, for example, co-current flow may also be used.

In some embodiments, biomass conversion systems employing a centripetal force-based separation mechanism may further comprise a phase separation mechanism in fluid communication with an outlet of the catalytic reduction reactor unit. Suitable phase separation mechanisms may include for, example, phase separation, solvent stripping columns, extractors, filters, distillations and the like. In an embodiment, azeotropic distillation may be conducted. In some embodiments, the phase separation mechanism may be used to separate an aqueous phase and an organic phase of the reaction product. In some embodiments, at least a portion of the aqueous phase may be recirculated to the hydrothermal digestion unit and/or be used to transport cellulosic fines back to the digestion unit. In some or other embodiments, at least a portion of the organic phase may be removed from the fluid circulation loop and subsequently be converted into a biofuel, as described hereinafter. In some embodiments, at least a portion of the organic phase may be recirculated to the digestion unit.

Figure 3:
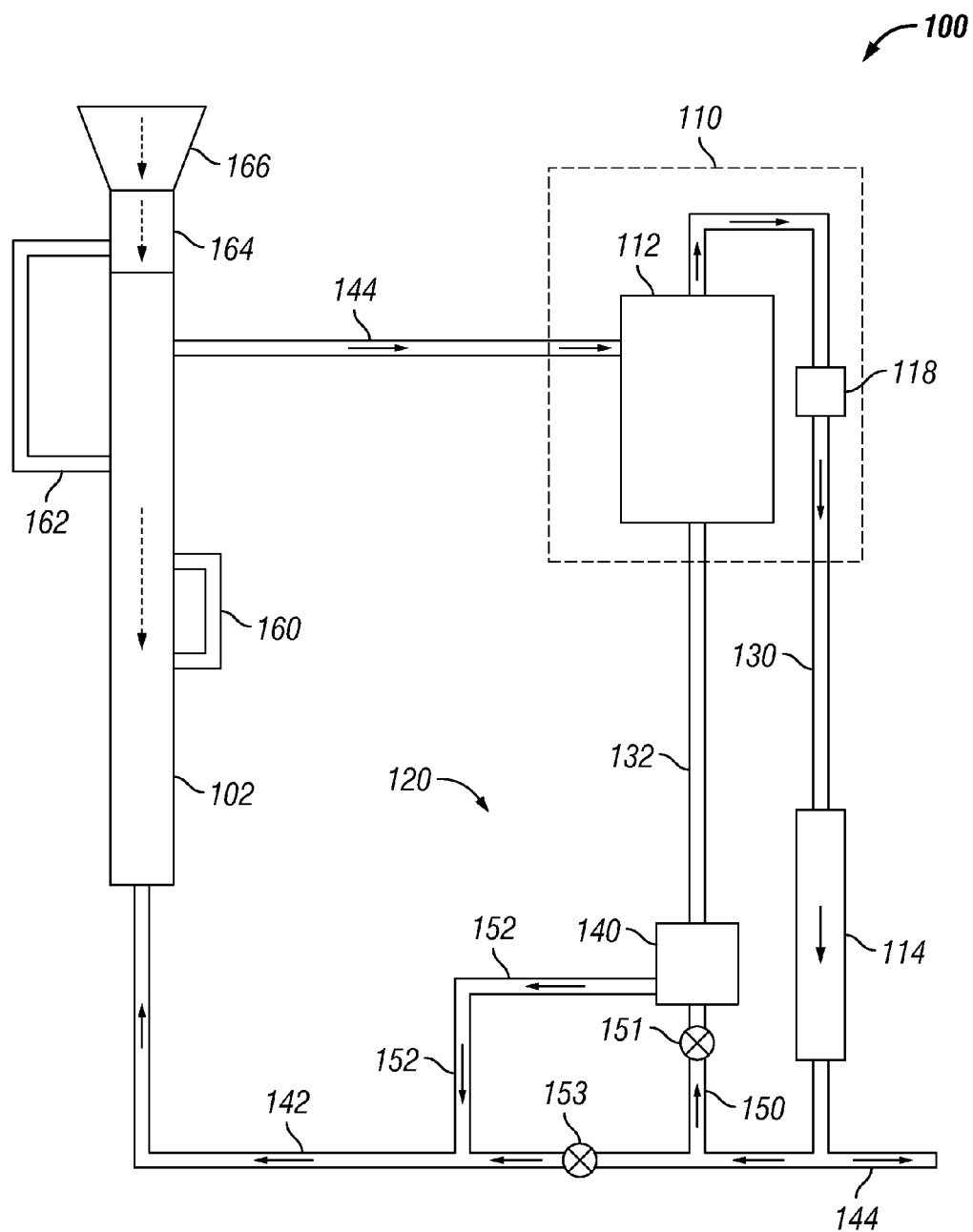
FIG. 3 shows a schematic of an illustrative biomass conversion system in which a hydroclone is used to remove cellulosic fines.

Embodiments of biomass conversion systems that utilize a hydroclone will now be described in further detail with reference to the drawings. FIG. 3 shows a schematic of an illustrative biomass conversion system 100 in which a hydroclone is used to remove cellulosic fines. Biomass conversion system 100 contains hydrothermal digestion unit 102, solids separation unit 110 which contains hydroclone 112, and catalytic reduction reactor unit 114, which together comprise fluid circulation loop 120. Optionally, secondary filter 118 may be present between solids separation unit 110 and catalytic reduction reactor unit 114. Hydroclone 112 contains a fluid outlet that establishes fluid communication with catalytic reduction reactor unit 114 via line 130. Hydroclone 112 also contains a solids outlet connected to line 132 that allows cellulosic fines to be removed from hydroclone 112. Although FIG. 3 has depicted only a single hydroclone, it is to be recognized that any number of hydroclones greater than or equal to one may also be used in the present embodiments. For example, multiple hydroclones may be used in parallel, in series, or any combination thereof in order to achieve a desired degree of cellulosic fines separation from a liquor phase obtained from hydrothermal digestion unit 102.

A liquor phase containing hydrolysate may travel from hydrothermal digestion unit 102 to hydroclone 112 via line 144. Once solids separation takes place in hydroclone 112, the hydrolysate then travels to catalytic reduction reactor unit 114 via line 130. A reaction product may be produced from soluble carbohydrates in the liquor phase in catalytic reduction reactor unit 114. At least a portion of this reaction product may be recirculated to hydrothermal digestion unit 102 via line 142, if desired. Reaction product not recirculated to hydrothermal digestion unit 102 may be removed via takeoff line 144 and thereafter be further converted into a biofuel.

Biomass conversion system 100 also may optionally contain solids collection unit 140 in which cellulosic fines may collect once separated in hydroclone 112. Cellulosic fines may travel to solids collection unit 140 via line 132. In an alternative configuration (not shown), line 132 may directly connect to hydrothermal digestion unit 102 or line 142 in order to directly return the cellulosic fines. In some embodiments, at least a portion of the reaction product produced in catalytic reduction reactor unit 114 may be used to transfer the collected cellulosic fines in solids collection unit 140 to hydrothermal digestion unit 102. As depicted in FIG. 3, a reaction product from catalytic reduction reactor unit 114 may enter solids collection unit 140 via line 150. The reaction product and cellulosic fines may then travel from solids collection unit 140 via line 152, which reconnects with line 142. Alternatively, line 152 may directly reconnect to hydrothermal digestion unit 102. In some embodiments, the reaction product may be continuously circulated through solids collection unit 140. In other embodiments, the reaction product may be periodically circulated through solids collection unit 140, in which case the reaction product may flow directly back to hydrothermal digestion unit 102 via line 142. Regulation and direction of the reaction product fluid flow may be performed using valves 151 and 153. The position of these valves should be considered illustrative in nature, and other valves may be present, if desired.

As described in more detail for FIG. 1, optional line 160 may be used to recirculate the liquor phase within the digestion unit, and optional line 162 may be used to transfer liquor phase from the digestion unit. For example, the liquor phase may be used to at least partially pressurize pressurization zone 164. Cellulosic biomass may be supplied to pressurization zone 164 from loading mechanism 166 before pressurizing and introduction of the pressurized biomass to hydrothermal digestion unit 102. Likewise, line 142 may be configured such that countercurrent flow is established within hydrothermal digestion unit 102, where the direction of biomass introduction into hydrothermal digestion unit 102 is indicated by a dashed arrow. As previously described, other flow configurations may also be used.

In some embodiments, the biomass conversion systems may be used for the processing of cellulosic biomass, as described above. In some embodiments, the methods can comprise: providing a biomass conversion system that comprises a fluid circulation loop comprising: a hydrothermal digestion unit; a solids separation unit that is in fluid communication with an outlet of the hydrothermal digestion unit; wherein the solids separation unit comprises a centripetal force-based separation mechanism; and a catalytic reduction reactor unit that is in fluid communication with a fluid outlet of the solids separation unit and an inlet of the hydrothermal digestion unit; providing a cellulosic biomass in the hydrothermal digestion unit; at least partially digesting the cellulosic biomass in the hydrothermal digestion unit to form a hydrolysate comprising soluble carbohydrates and cellulosic fines within a liquor phase; flowing the liquor phase through the solids separation unit to remove at least a portion of the cellulosic fines; after removing at least a portion of the cellulosic fines, flowing the liquor phase to the catalytic reduction reactor unit and forming a reaction product in the catalytic reduction reactor unit; and recirculating at least a portion of the reaction product to the hydrothermal digestion unit.

In some embodiments, the methods can comprise: providing a biomass conversion system that comprises a fluid circulation loop comprising: a hydrothermal digestion unit; a solids separation unit that is in fluid communication with an outlet of the hydrothermal digestion unit; wherein the solids separation unit comprises a centripetal force-based separation mechanism; and a catalytic reduction reactor unit that is in fluid communication with a fluid outlet of the solids separation unit and an inlet of the hydrothermal digestion unit; providing a cellulosic biomass in the hydrothermal digestion unit; at least partially digesting the cellulosic biomass in the hydrothermal digestion unit to form a hydrolysate comprising soluble carbohydrates and cellulosic fines within a liquor phase; flowing the liquor phase through the solids separation unit to remove at least a portion of the cellulosic fines; after removing at least a portion of the cellulosic fines, flowing the liquor phase to the catalytic reduction reactor unit and forming a reaction product in the catalytic reduction reactor unit; collecting the cellulosic fines in a solids collection unit; and transferring at least a portion of the collected cellulosic fines to the hydrothermal digestion unit using at least a portion of the reaction product.

In the various embodiments described herein, the hydrothermal digestion unit may typically be maintained at a pressure of at least about 30 bar to ensure that digestion takes place at a desired rate. In some embodiments, the hydrothermal digestion unit may be maintained at a pressure ranging between about 30 bar and about 430 bar. In some embodiments, the hydrothermal digestion unit may be maintained at a pressure ranging between about 50 bar and about 330 bar. In some embodiments, the hydrothermal digestion unit may be maintained at a pressure ranging between about 70 bar and about 130 bar. In still other embodiments, the hydrothermal digestion unit may be maintained at a pressure ranging between about 30 bar and about 130 bar. It is to be noted that the foregoing pressures refer to the pressures at which digestion takes place. That is, the foregoing pressures refer to normal operating pressures for the hydrothermal digestion unit.

In some embodiments, the methods described herein may further comprise converting the hydrolysate into a biofuel. In some embodiments, conversion of the hydrolysate into a biofuel may begin with a catalytic hydrogenolysis reaction to transform soluble carbohydrates produced from digestion into a reaction product comprising oxygenated intermediates, as described above. As described above and depicted in FIGS. 1-3, the reaction product may be recirculated to the hydrothermal digestion unit to further aid in the digestion process. The reaction product may also be used to transfer return cellulosic fines to the digestion unit for further digestion. In some embodiments, the reaction product may be further transformed by any number of further catalytic reforming reactions including, for example, further catalytic reduction reactions (e.g., hydrogenolysis reactions, hydrogenation reactions, hydrotreating reactions, and the like), condensation reactions, isomerization reactions, desulfurization reactions, dehydration reactions, oligomerization reactions, alkylation reactions, and the like. A description of the initial hydrogenolysis reaction and the further catalytic reforming reactions are described hereinafter.

Various processes are known for performing hydrogenolysis of carbohydrates. One suitable method includes contacting a carbohydrate or stable hydroxyl intermediate with hydrogen, optionally mixed with a diluent gas, and a hydrogenolysis catalyst under conditions effective to form a reaction product comprising oxygenated intermediates such as, for example, smaller molecules or polyols. As used herein, the term "smaller molecules or polyols" includes any molecule that having a lower molecular weight, which may include a smaller number of carbon atoms or oxygen atoms, than the starting carbohydrate. In an embodiment, the reaction products may include smaller molecules such as, for example, polyols and alcohols. This aspect of hydrogenolysis entails the breaking of carbon-carbon bonds In an embodiment, a soluble carbohydrate may be converted to relatively stable oxygenated intermediates such as, for example, propylene glycol, ethylene glycol, and glycerol using a hydrogenolysis reaction in the presence of a catalyst that is capable of activating molecular hydrogen. Suitable catalysts may include, for example, Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. In some embodiments, the catalysts and promoters may allow for hydrogenation and hydrogenolysis reactions to occur at the same time or in succession, such as the hydrogenation of a carbonyl group to form an alcohol. The catalyst may also include a carbonaceous pyropolymer catalyst containing transition metals (e.g., chromium, molybdenum, tungsten, rhenium, manganese, copper, and cadmium) or Group VIII metals (e.g., iron, cobalt, nickel, platinum, palladium, rhodium, ruthenium, iridium, and osmium). In certain embodiments, the catalyst may include any of the above metals combined with an alkaline earth metal oxide or adhered to a catalytically active support. In certain embodiments, the catalyst described in the hydrogenolysis reaction may include a catalyst support.

The conditions for which to carry out the hydrogenolysis reaction will vary based on the type of biomass starting material and the desired products (e.g. gasoline or diesel), for example. One of ordinary skill in the art, with the benefit of this disclosure, will recognize the appropriate conditions to use to carry out the reaction. In general, the hydrogenolysis reaction may be conducted at temperatures in the range of about 110° C. to about 300° C., and preferably from about 170° C. to about 300° C., and most preferably from about 180° C. to about 290° C.

In an embodiment, the hydrogenolysis reaction may be conducted under basic conditions, preferably at a pH of about 8 to about 13, and even more preferably at a pH of about 10 to about 12. In an embodiment, the hydrogenolysis reaction may be conducted at a pressure ranging between about 1 bar (absolute) and about 150 bar, and preferably at a pressure ranging between about 15 bar and about 140 bar, and even more preferably at a pressure ranging between 50 bar and 110 bar.

The hydrogen used in the hydrogenolysis reaction may include external hydrogen, recycled hydrogen, in situ generated hydrogen, or any combination thereof.

In some embodiments, the reaction products of the hydrogenolysis reaction may comprise greater than about 25% by mole, or alternatively, greater than about 30% by mole of polyols, which may result in a greater conversion to a biofuel in a subsequent processing reaction.

In some embodiments, hydrogenolysis may be conducted under neutral or acidic conditions, as needed to accelerate hydrolysis reactions in addition to the hydrogenolysis reaction. For example, hydrolysis of oligomeric carbohydrates may be combined with hydrogenation to produce sugar alcohols, which may undergo hydrogenolysis.

A second aspect of hydrogenolysis entails the breaking of —OH bonds such as: $RC(H)_2$—$OH+H_2 \rightarrow RCH_3+H_2O$. This reaction is also called "hydrodeoxygenation," and may occur in parallel with C—C bond breaking hydrogenolysis. Diols may be converted to mono-oxygenates via this reaction. As reaction severity is increased with increased temperature or contact time with catalyst, the concentration of polyols and diols relative to mono-oxygenates may diminish as a result of hydrodeoxygenation. Selectivity for C—C vs. C—OH bond hydrogenolysis will vary with catalyst type and formulation. Full de-oxygenation to alkanes may also occur, but is generally undesirable if the intent is to produce mono-oxygenates or diols and polyols which may be condensed or oligomerized to higher molecular weight compounds in a subsequent processing step. Typically, it is desirable to send only mono-oxygenates or diols to subsequent processing steps, as higher polyols may lead to excessive coke formation during condensation or oligomerization. Alkanes, in contrast, are essentially unreactive and cannot be readily combined to produce higher molecular compounds.

Once oxygenated intermediates have been formed by a hydrogenolysis reaction, a portion of the reaction product may be recirculated to the hydrothermal digestion unit to serve as an internally generated digestion solvent. Another portion of the reaction product may be withdrawn and subsequently processed by further reforming reactions to form a biofuel. Before being subjected to the further reforming reactions, the oxygenated intermediates may optionally be separated into different components. Suitable separations may include, for example, phase separation, solvent stripping columns, extractors, filters, distillations and the like. In some embodiments, a separation of lignin from the oxygenated intermediates before the reaction product is subsequently processed further or recirculated to the hydrothermal digestion unit.

The oxygenated intermediates may be processed to produce a fuel blend in one or more processing reactions. In an embodiment, a condensation reaction may be used along with other reactions to generate a fuel blend and may be catalyzed by a catalyst comprising an acid, a base, or both. In general, without being limited to any particular theory, it is believed that the basic condensation reactions may involve a series of steps involving: (1) an optional dehydrogenation reaction; (2) an optional dehydration reaction that may be acid catalyzed; (3) an aldol condensation reaction; (4) an optional ketonization reaction; (5) an optional furanic ring opening reaction; (6) hydrogenation of the resulting condensation products to form a $\geq C_4$ hydrocarbon; and (7) any combination thereof. Acid catalyzed condensations may similarly entail optional hydrogenation or dehydrogenation reactions, dehydration, and oligomerization reactions. Additional polishing reactions may also be used to conform the product to a specific fuel standard, including reactions conducted in the presence of hydrogen and a hydrogenation catalyst to remove functional groups from final fuel product. In some embodiments, a basic catalyst, a catalyst having both an acid and a base functional site, and optionally comprising a metal function, may also be used to effect the condensation reaction.

In some embodiments, an aldol condensation reaction may be used to produce a fuel blend meeting the requirements for a diesel fuel or jet fuel. Traditional diesel fuels are petroleum distillates rich in paraffinic hydrocarbons. They have boiling ranges as broad as 187° C. to 417° C., which are suitable for combustion in a compression ignition engine, such as a diesel engine vehicle. The American Society of Testing and Materials (ASTM) establishes the grade of diesel according to the boiling range, along with allowable ranges of other fuel properties, such as cetane number, cloud point, flash point, viscosity, aniline point, sulfur content, water content, ash content, copper strip corrosion, and carbon residue. Thus, any fuel blend meeting ASTM D975 may be defined as diesel fuel.

The present disclosure also provides methods to produce jet fuel. Jet fuel is clear to straw colored. The most common fuel is an unleaded/paraffin oil-based fuel classified as Aeroplane A-1, which is produced to an internationally standardized set of specifications. Jet fuel is a mixture of a large number of different hydrocarbons, possibly as many as a thousand or more. The range of their sizes (molecular weights or carbon numbers) is restricted by the requirements for the product, for example, freezing point or smoke point. Kerosene-type Airplane fuel (including Jet A and Jet A-1) has a carbon number distribution between about $C_8$ and $C_{16}$. Wide-cut or naphtha-type Airplane fuel (including Jet B) typically has a carbon number distribution between about $C_5$ and $C_{15}$. A fuel blend meeting ASTM D1655 may be defined as jet fuel.

In certain embodiments, both Airplanes (Jet A and Jet B) contain a number of additives. Useful additives include, but are not limited to, antioxidants, antistatic agents, corrosion inhibitors, and fuel system icing inhibitor (FSII) agents. Antioxidants prevent gumming and usually, are based on alkylated phenols, for example, AO-30, AO-31, or AO-37. Antistatic agents dissipate static electricity and prevent sparking. Stadis 450 with dinonylnaphthylsulfonic acid (DINNSA) as the active ingredient, is an example. Corrosion inhibitors (e.g., DCI-4A) are used for civilian and military fuels, and DCI-6A is used for military fuels. FSII agents, include, for example, Di-EGME.

In some embodiments, the oxygenated intermediates may comprise a carbonyl-containing compound that may take part in a base catalyzed condensation reaction. In some embodiments, an optional dehydrogenation reaction may be used to increase the amount of carbonyl-containing compounds in the oxygenated intermediate stream to be used as a feed to the condensation reaction. In these embodiments, the oxygenated intermediates and/or a portion of the bio-based feedstock stream may be dehydrogenated in the presence of a catalyst.

In some embodiments, a dehydrogenation catalyst may be preferred for an oxygenated intermediate stream comprising alcohols, diols, and triols. In general, alcohols cannot participate in aldol condensation directly. The hydroxyl group or groups present may be converted into carbonyls (e.g., aldehydes, ketones, etc.) in order to participate in an aldol condensation reaction. A dehydrogenation catalyst may be included to effect dehydrogenation of any alcohols, diols, or polyols present to form ketones and aldehydes. The dehydration catalyst is typically formed from the same metals as used for hydrogenation, hydrogenolysis, or aqueous phase reforming. These catalysts are described in more detail above. Dehydrogenation yields may be enhanced by the removal or consumption of hydrogen as it forms during the reaction. The dehydrogenation step may be carried out as a separate reaction step before an aldol condensation reaction, or the dehydrogenation reaction may be carried out in concert with the aldol condensation reaction. For concerted dehydrogenation and aldol condensation reactions, the dehydrogenation and aldol condensation functions may take place on the same catalyst. For example, a metal hydrogenation/dehydrogenation functionality may be present on catalyst comprising a basic functionality.

The dehydrogenation reaction may result in the production of a carbonyl-containing compound. Suitable carbonyl-containing compounds may include, but are not limited to, any compound comprising a carbonyl functional group that may form carbanion species or may react in a condensation reaction with a carbanion species. In an embodiment, a carbonyl-containing compound may include, but is not limited to, ketones, aldehydes, furfurals, hydroxy carboxylic acids, and, carboxylic acids. Ketones may include, without limitation, hydroxyketones, cyclic ketones, diketones, acetone, propanone, 2-oxopropanal, butanone, butane-2,3-dione, 3-hydroxybutane-2-one, pentanone, cyclopentanone, pentane-2,3-dione, pentane-2,4-dione, hexanone, cyclohexanone, 2-methyl-cyclopentanone, heptanone, octanone, nonanone, decanone, undecanone, dodecanone, methylglyoxal, butanedione, pentanedione, diketohexane, dihydroxyacetone, and isomers thereof. Aldehydes may include, without limitation, hydroxyaldehydes, acetaldehyde, glyceraldehyde, propionaldehyde, butyraldehyde, pentanal, hexanal, heptanal, octanal, nonal, decanal, undecanal, dodecanal, and isomers thereof. Carboxylic acids may include, without limitation, formic acid, acetic acid, propionic acid, butanoic acid, pentanoic acid, hexanoic acid, heptanoic acid, isomers and derivatives thereof, including hydroxylated derivatives, such as 2-hydroxybutanoic acid and lactic acid. Furfurals may include, without limitation, hydroxylmethylfurfural, 5-hydroxymethyl-2(5H)-furanone, dihydro-5-(hydroxymethyl)-2(3H)-furanone, tetrahydro-2-furoic acid, dihydro-5-(hydroxymethyl)-2(3H)-furanone, tetrahydrofurfuryl alcohol, 1-(2-furyl)ethanol, hydroxymethyltetrahydrofurfural, and isomers thereof. In an embodiment, the dehydrogenation reaction may result in the production of a carbonyl-containing compound that is combined with the oxygenated intermediates to become a part of the oxygenated intermediates fed to the condensation reaction.

In an embodiment, an acid catalyst may be used to optionally dehydrate at least a portion of the oxygenated intermediate stream. Suitable acid catalysts for use in the dehydration reaction may include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst may also include a modifier. Suitable modifiers may include, for example, La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst may also include a metal. Suitable metals may include, for example, Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in solution.

In some embodiments, the dehydration reaction may occur in the vapor phase. In other embodiments, the dehydration reaction may occur in the liquid phase. For liquid phase dehydration reactions, an aqueous solution may be used to carry out the reaction. In an embodiment, other solvents in addition to water, may be used to form the aqueous solution. For example, water soluble organic solvents may be present. Suitable solvents may include, but are not limited to, hydroxymethylfurfural (HMF), dimethylsulfoxide (DMSO), 1-methyl-n-pyrollidone (NMP), and any combination thereof. Other suitable aprotic solvents may also be used alone or in combination with any of these solvents.

In an embodiment, the processing reactions may comprise an optional ketonization reaction. A ketonization reaction may increase the number of ketone functional groups within at least a portion of the oxygenated intermediates. For example, an alcohol may be converted into a ketone in a ketonization reaction. Ketonization may be carried out in the presence of a basic catalyst. Any of the basic catalysts described above as the basic component of the aldol condensation reaction may be used to effect a ketonization reaction. Suitable reaction conditions are known to one of ordinary skill in the art and generally correspond to the reaction conditions listed above with respect to the aldol condensation reaction. The ketonization reaction may be carried out as a separate reaction step, or it may be carried out in concert with the aldol condensation reaction. The inclusion of a basic functional site on the aldol condensation catalyst may result in concerted ketonization and aldol condensation reactions.

In an embodiment, the processing reactions may comprise an optional furanic ring opening reaction. A furanic ring opening reaction may result in the conversion of at least a portion of any oxygenated intermediates comprising a furanic ring into compounds that are more reactive in an aldol condensation reaction. A furanic ring opening reaction may be carried out in the presence of an acidic catalyst. Any of the acid catalysts described above as the acid component of the aldol condensation reaction may be used to effect a furanic ring opening reaction. Suitable reaction conditions are known to one of ordinary skill in the art and generally correspond to the reaction conditions listed above with respect to the aldol condensation reaction. The furanic ring opening reaction may be carried out as a separate reaction step, or it may be carried out in concert with the aldol condensation reaction. The inclusion of an acid functional site on the aldol condensation catalyst may result in a concerted furanic ring opening reaction and aldol condensation reactions. Such an embodiment may be advantageous as any furanic rings may be opened in the presence of an acid functionality and reacted in an aldol condensation reaction using a basic functionality. Such a concerted reaction scheme may allow for the production of a greater amount of higher hydrocarbons to be formed for a given oxygenated intermediate feed.

In an embodiment, production of a $\geq C_4$ compound may occur by condensation, which may include aldol condensation of the oxygenated intermediates in the presence of a condensation catalyst. Aldol-condensation generally involves the carbon-carbon coupling between two compounds, at least one of which may contain a carbonyl group, to form a larger organic molecule. For example, acetone may react with hydroxymethylfurfural to form a $C_9$ species, which may subsequently react with another hydroxymethylfurfural molecule to form a $C_{15}$ species. In various embodiments, the reaction is usually carried out in the presence of a condensation catalyst. The condensation reaction may be carried out in the vapor or liquid phase. In an embodiment, the reaction may take place at a temperature ranging from about 7° C. to about 377° C. depending on the reactivity of the carbonyl group.

The condensation catalyst will generally be a catalyst capable of forming longer chain compounds by linking two molecules through a new carbon-carbon bond, such as a basic catalyst, a multi-functional catalyst having both acid and base functionalities, or either type of catalyst also comprising an optional metal functionality. In an embodiment, the multi-functional catalyst may be a catalyst having both a strong acid and a strong base functionalities. In an embodiment, aldol catalysts may comprise Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In an embodiment, the base catalyst may also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In an embodiment, the condensation catalyst comprises mixed-oxide base catalysts. Suitable mixed-oxide base catalysts may comprise a combination of magnesium, zirconium, and oxygen, which may comprise, without limitation: Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combinations thereof. Different atomic ratios of Mg/Zr or the combinations of various other elements constituting the mixed oxide catalyst may be used ranging from about 0.01 to about 50. In an embodiment, the condensation catalyst may further include a metal or alloys comprising metals, such as Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Such metals may be preferred when a dehydrogenation reaction is to be carried out in concert with the aldol condensation reaction. In an embodiment, preferred Group IA materials may include Li, Na, K, Cs and Rb. In an embodiment, preferred Group IIA materials may include Mg, Ca, Sr and Ba. In an embodiment, Group IIB materials may include Zn and Cd. In an embodiment, Group IIIB materials may include Y and La. Basic resins may include resins that exhibit basic functionality. The basic catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In one embodiment, the condensation catalyst may be derived from the combination of MgO and $Al_2O_3$ to form a hydrotalcite material. Another preferred material contains ZnO and $Al_2O_3$ in the form of a zinc aluminate spinel. Yet another preferred material is a combination of ZnO, $Al_2O_3$, and CuO. Each of these materials may also contain an additional metal function provided by a Group VIIIB metal, such as Pd or Pt. Such metals may be preferred when a dehydrogenation reaction is to be carried out in concert with the aldol condensation reaction. In one embodiment, the basic catalyst may be a metal oxide containing Cu, Ni, Zn, V, Zr, or mixtures thereof. In another embodiment, the basic catalyst may be a zinc aluminate metal containing Pt, Pd Cu, Ni, or mixtures thereof.

In some embodiments, a base-catalyzed condensation reaction may be performed using a condensation catalyst with both an acidic and basic functionality. The acid-aldol condensation catalyst may comprise hydrotalcite, zinc-aluminate, phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the acid-base catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and combinations thereof. In an embodiment, the acid-base catalyst may include a metal functionality provided by Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. In one embodiment, the catalyst further includes Zn, Cd or phosphate. In one embodiment, the condensation catalyst may be a metal oxide containing Pd, Pt, Cu or Ni, and even more preferably an aluminate or zirconium metal oxide containing Mg and Cu, Pt, Pd or Ni. The acid-base catalyst may also include a hydroxyapatite (HAP) combined with any one or more of the above metals. The acid-base catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In an embodiment, the condensation catalyst may also include zeolites and other microporous supports that contain Group IA compounds, such as Li, NA, K, Cs and Rb. Preferably, the Group IA material may be present in an amount less than that required to neutralize the acidic nature of the support. A metal function may also be provided by the addition of group VIIIB metals, or Cu, Ga, In, Zn or Sn. In one embodiment, the condensation catalyst may be derived from the combination of MgO and $Al_2O_3$ to form a hydrotalcite material. Another preferred material may contain a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

The condensation catalyst may be self-supporting (i.e., the catalyst does not need another material to serve as a support), or may require a separate support suitable for suspending the catalyst in the reactant stream. One exemplary support is silica, especially silica having a high surface area (greater than 100 square meters per gram), obtained by sol-gel synthesis, precipitation, or fuming. In other embodiments, particularly when the condensation catalyst is a powder, the catalyst system may include a binder to assist in forming the catalyst into a desirable catalyst shape. Applicable forming processes may include extrusion, pelletization, oil dropping, or other known processes. Zinc oxide, alumina, and a peptizing agent may also be mixed together and extruded to produce a formed material. After drying, this material may be calcined at a temperature appropriate for formation of the catalytically active phase. Other catalyst supports as known to one having ordinary skill in the art may also be used.

In some embodiments, a dehydration catalyst, a dehydrogenation catalyst, and the condensation catalyst may be present in the same reactor as the reaction conditions overlap to some degree. In these embodiments, a dehydration reaction and/or a dehydrogenation reaction may occur substantially simultaneously with the condensation reaction. In some embodiments, a catalyst may comprise active sites for a dehydration reaction and/or a dehydrogenation reaction in addition to a condensation reaction. For example, a catalyst may comprise active metals for a dehydration reaction and/or a dehydrogenation reaction along with a condensation reaction at separate sites on the catalyst or as alloys. Suitable active elements may comprise any of those listed above with respect to the dehydration catalyst, dehydrogenation catalyst, and the condensation catalyst. Alternately, a physical mixture of dehydration, dehydrogenation, and condensation catalysts may be employed. While not intending to be limited by theory, it is believed that using a condensation catalyst comprising a metal and/or an acid functionality may assist in pushing the equilibrium limited aldol condensation reaction towards completion. Advantageously, this may be used to effect multiple condensation reactions with dehydration and/or dehydrogenation of intermediates, in order to form (via condensation, dehydration, and/or dehydrogenation) higher molecular weight oligomers as desired to produce jet or diesel fuel.

The specific $\geq C_4$ compounds produced in the condensation reaction may depend on various factors, including, without limitation, the type of oxygenated intermediates in the reactant stream, condensation temperature, condensation pressure, the reactivity of the catalyst, and the flow rate of the reactant stream. In general, the condensation reaction may be carried out at a temperature at which the thermodynamics of the proposed reaction are favorable. For condensed phase liquid reactions, the pressure within the reactor must be sufficient to maintain at least a portion of the reactants in the condensed liquid phase at the reactor inlet. For vapor phase reactions, the reaction should be carried out at a temperature where the vapor pressure of the oxygenates is at least about 0.1 bar, and the thermodynamics of the reaction are favorable. The condensation temperature will vary depending upon the specific oxygenated intermediates used, but may generally range between about 75° C. and about 500° C. for reactions taking place in the vapor phase, and more preferably range between about 125° C. and about 450° C. For liquid phase reactions, the condensation temperature may range between about 5° C. and about 475° C., and the condensation pressure may range between about 0.01 bar and about 100 bar. Preferably, the condensation temperature may range between about 15° C. and about 300° C., or between about 15° C. and 250° C.

Varying the factors above, as well as others, will generally result in a modification to the specific composition and yields of the $\geq C_4$ compounds. For example, varying the temperature and/or pressure of the reactor system, or the particular catalyst formulations, may result in the production of $\geq C_4$ alcohols and/or ketones instead of $\geq C_4$ hydrocarbons. The $\geq C_4$ hydrocarbon product may also contain a variety of olefins, and alkanes of various sizes (typically branched alkanes). Depending upon the condensation catalyst used, the hydrocarbon product may also include aromatic and cyclic hydrocarbon compounds. The $\geq C_4$ hydrocarbon product may also contain undesirably high levels of olefins, which may lead to coking or deposits in combustion engines, or other undesirable hydrocarbon products. In such cases, the hydrocarbons may optionally be hydrogenated to reduce the ketones to alcohols and hydrocarbons, while the alcohols and olefinic hydrocarbons may be reduced to alkanes, thereby forming a more desirable hydrocarbon product having reduced levels of olefins, aromatics or alcohols.

The condensation reactions may be carried out in any reactor of suitable design, including continuous-flow, batch, semi-batch or multi-system reactors, without limitation as to design, size, geometry, flow rates, and the like. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reactions.

In a continuous flow system, the reactor system may include an optional dehydrogenation bed adapted to produce dehydrogenated oxygenated intermediates, an optional dehydration bed adapted to produce dehydrated oxygenated intermediates, and a condensation bed adapted to produce $\geq C_4$ compounds from the oxygenated intermediates. The dehydrogenation bed may be configured to receive the reactant stream and produce the desired oxygenated intermediates, which may have an increase in the amount of carbonyl-containing compounds. The dehydration bed may be configured to receive the reactant stream and produce the desired oxygenated intermediates. The condensation bed may be configured to receive the oxygenated intermediates for contact with the condensation catalyst and production of the desired $\geq C_4$ compounds. For systems with one or more finishing steps, an additional reaction bed for conducting the finishing process or processes may be included after the condensation bed.

In an embodiment, the optional dehydration reaction, the optional dehydrogenation reaction, the optional ketonization reaction, the optional ring opening reaction, and the condensation reaction catalyst beds may be positioned within the same reactor vessel or in separate reactor vessels in fluid communication with each other. Each reactor vessel preferably may include an outlet adapted to remove the product stream from the reactor vessel. For systems with one or more finishing steps, the finishing reaction bed or beds may be within the same reactor vessel along with the condensation bed or in a separate reactor vessel in fluid communication with the reactor vessel having the condensation bed.

In an embodiment, the reactor system also may include additional outlets to allow for the removal of portions of the reactant stream to further advance or direct the reaction to the desired reaction products, and to allow for the collection and recycling of reaction byproducts for use in other portions of the system. In an embodiment, the reactor system also may include additional inlets to allow for the introduction of supplemental materials to further advance or direct the reaction to the desired reaction products, and to allow for the recycling of reaction byproducts for use in other reactions.

In an embodiment, the reactor system also may include elements which allow for the separation of the reactant stream into different components which may find use in different reaction schemes or to simply promote the desired reactions. For instance, a separator unit, such as a phase separator, extractor, purifier or distillation column, may be installed prior to the condensation step to remove water from the reactant stream for purposes of advancing the condensation reaction to favor the production of higher hydrocarbons. In an embodiment, a separation unit may be installed to remove specific intermediates to allow for the production of a desired product stream containing hydrocarbons within a particular carbon number range, or for use as end products or in other systems or processes. The condensation reaction may produce a broad range of compounds with carbon numbers ranging from $C_4$ to $C_{30}$ or greater. Exemplary compounds may include, for example, $\geq C_4$ alkanes, $\geq C_4$ alkenes, $\geq C_5$ cycloalkanes, $\geq C_5$ cycloalkenes, aryls, fused aryls, $\geq C_4$ alcohols, $\geq C_4$ ketones, and mixtures thereof. The $\geq C_4$ alkanes and $\geq C_4$ alkenes may range from 4 to about 30 carbon atoms (i.e. $C_4$-$C_{30}$ alkanes and $C_4$-$C_{30}$ alkenes) and may be branched or straight chain alkanes or alkenes. The $\geq C_4$ alkanes and $\geq C_4$ alkenes may also include fractions of $C_7$-$C_{14}$, $C_{12}$-$C_{24}$ alkanes and alkenes, respectively, with the $C_7$-$C_{14}$ fraction directed to jet fuel blends, and the $C_{12}$-$C_{24}$ fraction directed to diesel fuel blends and other industrial applications. Examples of various $\geq C_4$ alkanes and $\geq C_4$ alkenes may include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4,-trimethylpentane, 2,3-dimethyl hexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The $\geq C_5$ cycloalkanes and $\geq C_5$ cycloalkenes may have from 5 to about 30 carbon atoms and may be unsubstituted, mono-substituted or multi-substituted. In the case of mono-substituted and multi-substituted compounds, the substituted group may include a branched $\geq C_3$ alkyl, a straight chain $\geq C_1$ alkyl, a branched $\geq C_3$ alkylene, a straight chain $\geq C_1$ alkylene, a straight chain $\geq C_2$ alkylene, an aryl group, or a combination thereof. In one embodiment, at least one of the substituted groups may include a branched $C_3$-$C_{12}$ alkyl, a straight chain $C_1$-$C_{12}$ alkyl, a branched $C_3$-$C_{12}$ alkylene, a straight chain $C_1$-$C_{12}$ alkylene, a straight chain $C_2$-$C_{12}$ alkylene, an aryl group, or a combination thereof. In yet another embodiment, at least one of the substituted groups may include a branched $C_3$-$C_4$ alkyl, a straight chain $C_1$-$C_4$ alkyl, a branched $C_3$-$C_4$ alkylene, a straight chain $C_1$-$C_4$ alkylene, a straight chain $C_2$-$C_4$ alkylene, an aryl group, or any combination thereof. Examples of desirable $\geq C_5$ cycloalkanes and $\geq C_5$ cycloalkenes may include, without limitation, cyclopentane, cyclopentene, cyclohexane, cyclohexene, methylcyclopentane, methylcyclopentene, ethylcyclopentane, ethylcyclopentene, ethylcyclohexane, ethylcyclohexene, and isomers thereof.

Aryl groups contain an aromatic hydrocarbon in either an unsubstituted (phenyl), mono-substituted or multi-substituted form. In the case of mono-substituted and multi-substituted compounds, the substituted group may include a branched $\geq C_3$ alkyl, a straight chain $\geq C_1$ alkyl, a branched $\geq C_3$ alkylene, a straight chain $\geq C2$ alkylene, a phenyl group, or a combination thereof. In one embodiment, at least one of the substituted groups may include a branched $C_3$-$C_{12}$ alkyl, a straight chain $C_1$-$C_{12}$ alkyl, a branched $C_3$-$C_{12}$ alkylene, a straight chain $C_2$-$C_{12}$ alkylene, a phenyl group, or any combination thereof. In yet another embodiment, at least one of the substituted groups may include a branched $C_3$-$C_4$ alkyl, a straight chain $C_1$-$C_4$ alkyl, a branched $C_3$-$C_4$ alkylene, a straight chain $C_2$-$C_4$ alkylene, a phenyl group, or any combination thereof. Examples of various aryl compounds may include, without limitation, benzene, toluene, xylene (dimethylbenzene), ethyl benzene, para-xylene, meta-xylene, ortho-xylene, and C9 aromatics.

Fused aryls contain bicyclic and polycyclic aromatic hydrocarbons, in either an unsubstituted, mono-substituted or multi-substituted form. In the case of mono-substituted and multi-substituted compounds, the substituted group may include a branched $\geq C_3$ alkyl, a straight chain $\geq C_1$ alkyl, a branched $\geq C_3$ alkylene, a straight chain $\geq C_2$ alkylene, a phenyl group, or a combination thereof. In another embodiment, at least one of the substituted groups may include a branched $C_3$-$C_4$ alkyl, a straight chain $C_1$-$C_4$ alkyl, a branched $C_3$-$C_4$ alkylene, a straight chain $C_2$-$C_4$ alkylene, a phenyl group, or any combination thereof. Examples of various fused aryls may include, without limitation, naphthalene, anthracene, tetrahydronaphthalene, and decahydronaphthalene, indane, indene, and isomers thereof.

The moderate fractions, such as $C_7$-$C_{14}$, may be separated for jet fuel, while heavier fractions, such as $C_{12}$-$C_{24}$, may be separated for diesel use. The heaviest fractions may be used as lubricants or cracked to produce additional gasoline and/or diesel fractions. The $\geq C_4$ compounds may also find use as industrial chemicals, whether as an intermediate or an end product. For example, the aryls toluene, xylene, ethylbenzene, para-xylene, meta-xylene, and ortho-xylene may find use as chemical intermediates for the production of plastics and other products. Meanwhile, $C_9$ aromatics and fused aryls, such as naphthalene, anthracene, tetrahydronaphthalene, and decahydronaphthalene, may find use as solvents in industrial processes.

In an embodiment, additional processes may be used to treat the fuel blend to remove certain components or further conform the fuel blend to a diesel or jet fuel standard. Suitable techniques may include hydrotreating to reduce the amount of or remove any remaining oxygen, sulfur, or nitrogen in the fuel blend. The conditions for hydrotreating a hydrocarbon stream are known to one of ordinary skill in the art.

In an embodiment, hydrogenation may be carried out in place of or after the hydrotreating process to saturate at least some olefinic bonds. In some embodiments, a hydrogenation reaction may be carried out in concert with the aldol condensation reaction by including a metal functional group with the aldol condensation catalyst. Such hydrogenation may be performed to conform the fuel blend to a specific fuel standard (e.g., a diesel fuel standard or a jet fuel standard). The hydrogenation of the fuel blend stream may be carried out according to known procedures, either with the continuous or batch method. The hydrogenation reaction may be used to remove remaining carbonyl groups and/or hydroxyl groups. In such cases, any of the hydrogenation catalysts described above may be used. In general, the finishing step may be carried out at finishing temperatures ranging between about 80° C. and about 250° C., and finishing pressures may range between about 5 bar and about 150 bar. In one embodiment, the finishing step may be conducted in the vapor phase or liquid phase, and use, external hydrogen, recycled hydrogen, or combinations thereof, as necessary.

In an embodiment, isomerization may be used to treat the fuel blend to introduce a desired degree of branching or other shape selectivity to at least some components in the fuel blend. It may also be useful to remove any impurities before the hydrocarbons are contacted with the isomerization catalyst. The isomerization step may comprise an optional stripping step, wherein the fuel blend from the oligomerization reaction may be purified by stripping with water vapor or a suitable gas such as light hydrocarbon, nitrogen or hydrogen. The optional stripping step may be carried out in a countercurrent manner in a unit upstream of the isomerization catalyst, wherein the gas and liquid are contacted with each other, or before the actual isomerization reactor in a separate stripping unit utilizing countercurrent principle.

After the optional stripping step the fuel blend may be passed to a reactive isomerization unit comprising one or more catalyst beds. The catalyst beds of the isomerization unit may operate either in co-current or countercurrent manner. In the isomerization unit, the pressure may vary between about 20 bar to about 150 bar, preferably between about 20 bar to about 100 bar, the temperature ranging between about 195° C. and about 500° C., preferably between about 300° C. and about 400° C. In the isomerization unit, any isomerization catalyst known in the art may be used. In some embodiments, suitable isomerization catalysts may contain molecular sieve and/or a metal from Group VII and/or a carrier. In an embodiment, the isomerization catalyst may contain SAPO-11 or SAPO41 or ZSM-22 or ZSM-23 or ferrierite and Pt, Pd or Ni and $Al_2O_3$ or $SiO_2$. Typical isomerization catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$.

Other factors, such as the concentration of water or undesired oxygenated intermediates, may also effect the composition and yields of the $\geq C_4$ compounds, as well as the activity and stability of the condensation catalyst. In such cases, the process may include a dewatering step that removes a portion of the water prior to the condensation reaction and/or the optional dehydration reaction, or a separation unit for removal of the undesired oxygenated intermediates. For instance, a separator unit, such as a phase separator, extractor, purifier or distillation column, may be installed prior to the condensation reactor so as to remove a portion of the water from the reactant stream containing the oxygenated intermediates. A separation unit may also be installed to remove specific oxygenated intermediates to allow for the production of a desired product stream containing hydrocarbons within a particular carbon range, or for use as end products or in other systems or processes.

Thus, in one embodiment, the fuel blend produced by the processes described herein is a hydrocarbon mixture that meets the requirements for jet fuel (e.g., conforms with ASTM D1655). In another embodiment, the product of the processes described herein is a hydrocarbon mixture that comprises a fuel blend meeting the requirements for a diesel fuel (e.g., conforms with ASTM D975).

In another embodiment, a fuel blend comprising gasoline hydrocarbons (i.e., a gasoline fuel) may be produced. "Gasoline hydrocarbons" refer to hydrocarbons predominantly comprising $C_{5-6}$ hydrocarbons, for example, $C_{6-8}$ hydrocarbons, and having a boiling point range from 32° C. (90° F.) to about 204° C. (400° F.). Gasoline hydrocarbons may include, but are not limited to, straight run gasoline, naphtha, fluidized or thermally catalytically cracked gasoline, VB gasoline, and coker gasoline. Gasoline hydrocarbons content is determined by ASTM Method D2887.

In yet another embodiment, the $\geq C_2$ olefins may be produced by catalytically reacting the oxygenated intermediates in the presence of a dehydration catalyst at a dehydration temperature and dehydration pressure to produce a reaction stream comprising the $\geq C_2$ olefins. The $\geq C_2$ olefins may comprise straight or branched hydrocarbons containing one or more carbon-carbon double bonds. In general, the $\geq C_2$ olefins may contain from 2 to 8 carbon atoms, and more preferably from 3 to 5 carbon atoms. In one embodiment, the olefins may comprise propylene, butylene, pentylene, isomers of the foregoing, and mixtures of any two or more of the foregoing. In another embodiment, the $\geq C_2$ olefins may include $\geq C_4$ olefins produced by catalytically reacting a portion of the $\geq C_2$ olefins over an olefin isomerization catalyst.

The dehydration catalyst may comprise a member selected from the group consisting of an acidic alumina, aluminum phosphate, silica-alumina phosphate, amorphous silica-alumina, aluminosilicate, zirconia, sulfated zirconia, tungstated zirconia, tungsten carbide, molybdenum carbide, titania, sulfated carbon, phosphated carbon, phosphated silica, phosphated alumina, acidic resin, heteropolyacid, inorganic acid, and a combination of any two or more of the foregoing. In one embodiment, the dehydration catalyst may further comprise a modifier selected from the group consisting of Ce, Y, Sc, La, Li, Na, K, Rb, Cs, Mg, Ca, Sr, Ba, P, B, Bi, and a combination of any two or more of the foregoing. In another embodiment, the dehydration catalyst may further comprise an oxide of an element, the element selected from the group consisting of Ti, Zr, V, Nb, Ta, Mo, Cr, W, Mn, Re, Al, Ga, In, Fe, Co, Ir, Ni, Si, Cu, Zn, Sn, Cd, P, and a combination of any two or more of the foregoing. In yet another embodiment, the dehydration catalyst may further comprise a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In yet another embodiment, the dehydration catalyst may comprise an aluminosilicate zeolite. In some embodiments, the dehydration catalyst may further comprise a modifier selected from the group consisting of Ga, In, Zn, Fe, Mo, Ag, Au, Ni, P, Sc, Y, Ta, a lanthanide, and a combination of any two or more of the foregoing. In some embodiments, the dehydration catalyst may further comprise a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In another embodiment, the dehydration catalyst may comprise a bifunctional pentasil ring-containing aluminosilicate zeolite. In some embodiments, the dehydration catalyst may further comprise a modifier selected from the group consisting of Ga, In, Zn, Fe, Mo, Ag, Au, Ni, P, Sc, Y, Ta, a lanthanide, and a combination of any two or more of the foregoing. In some embodiments, the dehydration catalyst may further comprise a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

The dehydration reaction may be conducted at a temperature and pressure where the thermodynamics are favorable. In general, the reaction may be performed in the vapor phase, liquid phase, or a combination of both. In one embodiment, the dehydration temperature may range between about 100° C. and about 500° C., and the dehydration pressure may range between about 1 bar (absolute) and about 60 bar. In another embodiment, the dehydration temperature may range between about 125° C. and about 450° C. In some embodiments, the dehydration temperature may range between about 150° C. and about 350° C., and the dehydration pressure may range between about 5 bar and about 50 bar. In yet another embodiment, the dehydration temperature may range between about 175° C. and about 325° C.

The $\geq C_6$ paraffins are produced by catalytically reacting $\geq C_2$ olefins with a stream of $\geq C_4$ isoparaffins in the presence of an alkylation catalyst at an alkylation temperature and alkylation pressure to produce a product stream comprising $\geq C_6$ paraffins. The $\geq C_4$ isoparaffins may include alkanes and cycloalkanes having 4 to 7 carbon atoms, such as isobutane, isopentane, naphthenes, and higher homologues having a tertiary carbon atom (e.g., 2-methylbutane and 2,4-dimethylpentane), isomers of the foregoing, and mixtures of any two or more of the foregoing. In one embodiment, the stream of $\geq C_4$ isoparaffins may comprise internally generated $\geq C_4$ isoparaffins, external $\geq C_4$ isoparaffins, recycled $\geq C_4$ isoparaffins, or combinations of any two or more of the foregoing.

The $\geq C_6$ paraffins may be branched paraffins, but may also include normal paraffins. In one version, the $\geq C_6$ paraffins may comprise a member selected from the group consisting of a branched $C_{6-10}$ alkane, a branched $C_6$ alkane, a branched $C_7$ alkane, a branched $C_8$ alkane, a branched $C_9$ alkane, a branched $C_{10}$ alkane, or a mixture of any two or more of the foregoing. In one version, the $\geq C_6$ paraffins may include, for example, dimethylbutane, 2,2-dimethylbutane, 2,3-dimethylbutane, methylpentane, 2-methylpentane, 3-methylpentane, dimethylpentane, 2,3-dimethylpentane, 2,4-dimethylpentane, methylhexane, 2,3-dimethylhexane, 2,3,4-trimethylpentane, 2,2,4-trimethylpentane, 2,2,3-trimethylpentane, 2,3,3-trimethylpentane, dimethylhexane, or mixtures of any two or more of the foregoing.

The alkylation catalyst may comprise a member selected from the group of sulfuric acid, hydrofluoric acid, aluminum chloride, boron trifluoride, solid phosphoric acid, chlorided alumina, acidic alumina, aluminum phosphate, silica-alumina phosphate, amorphous silica-alumina, aluminosilicate, aluminosilicate zeolite, zirconia, sulfated zirconia, tungstated zirconia, tungsten carbide, molybdenum carbide, titania, sulfated carbon, phosphated carbon, phosphated silica, phosphated alumina, acidic resin, heteropolyacid, inorganic acid, and a combination of any two or more of the foregoing. The alkylation catalyst may also include a mixture of a mineral acid with a Friedel-Crafts metal halide, such as aluminum bromide, and other proton donors.

In one embodiment, the alkylation catalyst may comprise an aluminosilicate zeolite. In some embodiments, the alkylation catalyst may further comprise a modifier selected from the group consisting of Ga, In, Zn, Fe, Mo, Ag, Au, Ni, P, Sc, Y, Ta, a lanthanide, and a combination of any two or more of the foregoing. In some embodiments, the alkylation catalyst may further comprise a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In another embodiment, the alkylation catalyst may comprise a bifunctional pentasil ring-containing aluminosilicate zeolite. In some embodiments, the alkylation catalyst may further comprise a modifier selected from the group consisting of Ga, In, Zn, Fe, Mo, Ag, Au, Ni, P, Sc, Y, Ta, a lanthanide, and a combination of any two or more of the foregoing. In some embodiments, the alkylation catalyst may further comprise a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing. In one version, the dehydration catalyst and the alkylation catalyst may be atomically identical.

The alkylation reaction may be conducted at a temperature where the thermodynamics are favorable. In general, the alkylation temperature may range between about $-20°$ C. and about $300°$ C., and the alkylation pressure may range between about 1 bar (absolute) and about 80 bar. In some embodiments, the alkylation temperature may range between about $100°$ C. and about $300°$ C. In another version, the alkylation temperature may range between about $0°$ C. and about $100°$ C. In yet other embodiments, the alkylation temperature may range between about $0°$ C. and about $50°$ C. In still other embodiments, the alkylation temperature may range between about $70°$ C. and about $250°$ C., and the alkylation pressure may range between about 5 bar and about 80 bar. In one embodiment, the alkylation catalyst may comprise a mineral acid or a strong acid. In another embodiment, the alkylation catalyst may comprise a zeolite and the alkylation temperature may be greater than about $100°$ C.

In an embodiment, an olefinic oligomerization reaction may conducted. The oligomerization reaction may be carried out in any suitable reactor configuration. Suitable configurations may include, but are not limited to, batch reactors, semi-batch reactors, or continuous reactor designs such as, for example, fluidized bed reactors with external regeneration vessels. Reactor designs may include, but are not limited to tubular reactors, fixed bed reactors, or any other reactor type suitable for carrying out the oligomerization reaction. In an embodiment, a continuous oligomerization process for the production of diesel and jet fuel boiling range hydrocarbons may be carried out using an oligomerization reactor for contacting an olefinic feed stream comprising short chain olefins having a chain length of from 2 to 8 carbon atoms with a zeolite catalyst under elevated temperature and pressure so as to convert the short chain olefins to a fuel blend in the diesel boiling range. The oligomerization reactor may be operated at relatively high pressures of about 20 bar to about 100 bar, and temperatures ranging between about $150°$ C. and about $300°$ C., preferably between about $200°$ C. to $250°$ C.

The resulting oligomerization stream results in a fuel blend that may have a wide variety of products including products comprising $C_5$ to $C_{24}$ hydrocarbons. Additional processing may be used to obtain a fuel blend meeting a desired standard. An initial separation step may be used to generate a fuel blend with a narrower range of carbon numbers. In an embodiment, a separation process such as a distillation process may be used to generate a fuel blend comprising $C_{12}$ to $C_{24}$ hydrocarbons for further processing. The remaining hydrocarbons may be used to produce a fuel blend for gasoline, recycled to the oligomerization reactor, or used in additional processes. For example, a kerosene fraction may be derived along with the diesel fraction and may either be used as an illuminating paraffin, as a jet fuel blending component in conventional crude or synthetic derived jet fuels, or as reactant (especially $C_{10}$ to $C_{13}$ fraction) in the process to produce LAB (Linear Alkyl Benzene). The naphtha fraction, after hydroprocessing, may be routed to a thermal cracker for the production of ethylene and propylene or routed to a catalytic cracker to produce ethylene, propylene, and gasoline.

Additional processes may be used to treat the fuel blend to remove certain components or further conform the fuel blend to a diesel or jet fuel standard. Suitable techniques may include hydrotreating to remove any remaining oxygen, sulfur, or nitrogen in the fuel blend. Hydrogenation may be carried after the hydrotreating process to saturate at least some olefinic bonds. Such hydrogenation may be performed to conform the fuel blend to a specific fuel standard (e.g., a diesel fuel standard or a jet fuel standard). The hydrogenation step of the fuel blend stream may be carried out according to the known procedures, in a continuous of batchwise manner.

To facilitate a better understanding of the present invention, the following examples of preferred embodiments are given. In no way should the following examples be read to limit, or to define, the scope of the invention.

EXAMPLES

Example 1

Flow of Hydrolysate from Digestion of Cellulosic Biomass in the Presence of a Filter without Backflushing Example 1A: A microflow digestion unit was constructed from ½-inch diameter by 1-foot long 316 stainless steel tubing, which was heated via an electric band heater (Gaumer Company, Inc.), and packed with 4.82 grams of nominal ⅛-inch by ¼-inch by 3-mm pine wood mini-chips (moisture content of 14% as determined by overnight drying in a vacuum oven at $80°$ C.). A digestion solvent comprising 20 wt. % 2-propanol, 25 wt. % ethanol, 2 wt. % dimethylketone, and 2 wt. % acetic acid in deionized water was prepared and buffered to pH 5.5 using 1N KOH. The buffered digestion solvent was fed to the digestion unit using an HPLC pump (Eldex). An in-line filter (Swagelok, 10 micron) was placed between the digestion unit and a high pressure product collection vessel for collecting effluent from the digestion unit. The digestion unit and product collection vessel were pressurized to 1000 psi with hydrogen and heated to $240°$ C., and digestion solvent flow was initiated at a flow rate of 0.1 mL/min using the HPLC pump. The HPLC pump outlet pressure rapidly increased to exceed the 1500 psi safety limit after less than 3 hours of operation, and solvent flow was terminated due to HPLC pump shutdown. Only 13.2 grams of effluent were collected in the product collection vessel prior to shutdown. The digestion unit outlet line and the filter were both found to be plugged with solid wood particulates from the digestion unit. The particulates had a particle size of less than 1-mm. Example 1B: Example 1A was repeated with 5.487 grams of pine mini-chips at a digestion unit temperature of 210° C. Overpressure and pump shutdown occurred after 4.7 hours of flow. Example 1C: Example 1A was repeated with 4.22-grams of pine mini-chips at a digestion unit temperature of 190° C. Overpressure triggered a pump shutdown after 4.8 hours, during which time 34 grams of effluent were collected. This amount of effluent corresponds to a throughput of only 8 grams of effluent per dry gram of wood feed. Example 1D: Example 1A was repeated with 4.91 grams of pine mini-chips at a digestion unit temperature of 190° C. for 2 hours, followed by 240° C. thereafter. Overpressure occurred after 5.1 hours, during which time 31.8 grams of effluent were collected (7.5 grams of effluent per dry gram of wood feed).

Example 2

Flow of Hydrolysate from Digestion of Cellulosic Biomass in the Presence of a Filter with Backflushing Example 2A: A 6 gram bed of AX-200 alumina catalyst support (Criterion Inc, 1/16-inch diameter extrudates) was placed between the outlet of the digestion unit and the in-line filter. A sample valve was added between the digestion unit and the fixed-bed filter, which allowed periodic backflush of the fixed-bed filter to take place. Digestion was conducted similarly to Example 1A, with the following exceptions. 4.29 grams of pine mini-chips were fed to the digestion unit, which was heated at 180° C. for 2 hours, followed by 240° C. for 10 hours. During this time, the fixed-bed filter was backflushed every 2-3 hours by purging 1-3 grams of liquid and solids from the fixed-bed filter. Supply of hydrogen to the product vessel at 1000 psi provided the pressure for backflush. The liquid pressure at the HPLC pump outlet remained less than 1020 psi, for a digestion unit and product collection vessel maintained at 980-1000 psi. No overpressure or automated shut down was observed during the experiment time, indicating an absence of pressure spikes to greater than 1500 psi. More than 166 grams of effluent were collected (44 grams of effluent per dry gram of wood feed). Example 2B: Example 2A was repeated under the same conditions with 4.29 grams of pine mini-chips. Flow was continued for 70 hours, and 261 grams of effluent were collected. No HPLC pump overpressure occurred during the test period.

Example 3

Flow of Hydrolysate from Digestion of Cellulosic Biomass in the Presence of a Gravity Separation Unit Example 3A: The system of Example 2A was prepared, except a 15 inch riser tube was connected to the digestion unit. The fixed-bed filter was omitted. The riser tube allowed solids and effluent to be isolated before entering the in-line filter. Three experiments were conducted using 4.43, 4.51, and 4.75 grams of pine mini-chips at a digestion solvent flowrate of 0.15 ml/min. Under these conditions, 51, 42, and 41 grams of effluent were collected without plugging of the in-line filter occurring or excessive pressure rises occurring at the HPLC pump. Samples from the riser were drained into 8 dram vials in 12-14 gram aliquots. Partially digested wood particulates eluted from the digestion unit gravity settled in the vials within about 15 minutes. Smaller floc material (e.g., less than 100 microns in size) formed upon cooling the effluent, and after 45 minutes to one hour of settling time, only about the top 10% of the effluent became clear, with the remaining 90% remaining opaque from suspended fines. Extended settling for 15 hours gave a 1-mm layer of black solids at the bottom of a 32 mm layer of transparent, orange-brown liquid with no turbidity. Centrifugation for 10 minutes at 3400 g's (International Equipment Company Model 428) was used to produce more rapid settling, producing a non-turbid, transparent liquid with a 1-mm bottom layer of solids following centrifugation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods may also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:
1. A method comprising:
  providing a biomass conversion system that comprises a fluid circulation loop comprising:
    a hydrothermal digestion unit;
    a solids separation unit that is in fluid communication with an outlet of the hydrothermal digestion unit;
    wherein the solids separation unit comprises a plurality of filters; and
    a catalytic reduction reactor unit that is in fluid communication with an outlet of the solids separation unit and an inlet of the hydrothermal digestion unit;
  providing a cellulosic biomass in the hydrothermal digestion unit;

at least partially digesting the cellulosic biomass in the hydrothermal digestion unit to form a hydrolysate comprising soluble carbohydrates and cellulosic fines within a liquor phase;

flowing the liquor phase through at least one of the filters to sequester the cellulosic fines; and backflushing at least a portion of the cellulosic fines to the hydrothermal digestion unit while the liquor phase continues to flow through one or more of the filters to the catalytic reduction reactor unit; and converting the hydrolysate into higher hydrocarbons.

2. The method of claim 1, further comprising:
forming a reaction product in the catalytic reduction reactor unit.

3. The method of claim 2, wherein the reaction product is used to backflush the cellulosic fines.

4. The method of claim 1, wherein the fluid circulation loop is configured such that countercurrent flow is established in the hydrothermal digestion unit.

5. The method of claim 1, wherein at least one of the plurality of filters comprises a catalytic filter comprising a solid support and a catalyst that is capable of activating molecular hydrogen.

6. The method of claim 5, further comprising:
at least partially converting the soluble carbohydrates into a reaction product on the catalytic filter.

7. The method of claim 6, further comprising:
further converting the soluble carbohydrates into the reaction product in the catalytic reduction reactor unit.

8. The method of claim 1, wherein the plurality of filters are connected in parallel to one another.

9. The method of claim 1, wherein the plurality of filters are arranged on a rotatable filter array.

10. The method of claim 1, further comprising:
reversing a direction of fluid flow in the filters being backflushed; and
reversing a direction of fluid flow in one or more of the other filters so as to backflush cellulosic fines therefrom.

11. The method of claim 1, wherein at least about 60% of the cellulosic biomass, on a dry basis, is digested to produce hydrolysate.

12. The method of claim 1, wherein at least about 90% of the cellulosic biomass, on a dry basis, is digested to produce hydrolysate.

13. The method of claim 1, further comprising:
converting the hydrolysate into a biofuel.

14. A method comprising:
providing a biomass conversion system that comprises a fluid circulation loop comprising:
a hydrothermal digestion unit;
a solids separation unit that is in fluid communication with an outlet of the hydrothermal digestion unit;
wherein the solids separation unit comprises a plurality of filters; and
a catalytic reduction reactor unit that is in fluid communication with an outlet of the solids separation unit and an inlet of the hydrothermal digestion unit;
providing a cellulosic biomass in the hydrothermal digestion unit;
at least partially digesting the cellulosic biomass in the hydrothermal digestion unit to form a hydrolysate comprising soluble carbohydrates and cellulosic fines within a liquor phase;
flowing the liquor phase through at least one of the filters to sequester the cellulosic fines;
at least partially converting the soluble carbohydrates into a reaction product in the catalytic reduction reactor unit; and
backflushing at least a portion of the cellulosic fines to the hydrothermal digestion unit using at least a portion of the reaction product; and
converting the hydrolysate into higher hydrocarbons.

15. The method of claim 14, wherein backflushing takes place while the liquor phase continues to flow through one or more of the filters to the catalytic reduction reactor unit.

16. The method of claim 14, wherein the fluid circulation loop is configured such that countercurrent flow is established in the hydrothermal digestion unit.

17. The method of claim 14, wherein at least one of the plurality of filters comprises a catalytic filter comprising a solid support and a catalyst that is capable of activating molecular hydrogen.

18. The method of claim 17, further comprising:
at least partially converting the soluble carbohydrates into the reaction product on the catalytic filter.

19. The method of claim 14, wherein the plurality of filters are connected in parallel to one another.

20. The method of claim 14, wherein the plurality of filters are arranged on a rotatable filter array.

21. The method of claim 14, further comprising:
reversing a direction of fluid flow in the filters being backflushed; and
reversing a direction of fluid flow in one or more of the other filters so as to backflush cellulosic fines therefrom.

22. The method of claim 14, wherein at least about 60% of the cellulosic biomass, on a dry basis, is digested to produce hydrolysate.

23. The method of claim 14, wherein at least about 90% of the cellulosic biomass, on a dry basis, is digested to produce hydrolysate.

24. The method of claim 14, further comprising:
converting the hydrolysate into a biofuel.

* * * * *